United States Patent
Hironaka et al.

(10) Patent No.: US 6,341,045 B1
(45) Date of Patent: *Jan. 22, 2002

(54) DISK-SHAPED RECORDING MEDIUM AND FORMATTING METHOD THEREOF WHEREIN HISTORIC INFORMATION INCLUDING A STORAGE CAPACITY OF THE DISK-SHAPED RECORDING MEDIUM IS RECORDED THEREON

(75) Inventors: Hisakazu Hironaka, Isehara; Toshiharu Shimizu, Machida; Yoshihide Majima, Hadano; Toshimitsu Itoh; Hidetsugu Touji, both of Atsugi, all of (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,827

(22) Filed: Dec. 17, 1997

(30) Foreign Application Priority Data

Dec. 24, 1996 (JP) .............................................. 8-342947
Jan. 14, 1997 (JP) .............................................. 9-004553
Jan. 21, 1997 (JP) .............................................. 9-008808
Feb. 20, 1997 (JP) .............................................. 9-036096

(51) Int. Cl.$^7$ ............................................... G11B 5/09
(52) U.S. Cl. ......................... 360/48; 360/53; 360/51; 360/77.08; 360/78.14
(58) Field of Search .................. 360/48, 53, 49, 360/50, 51, 75, 77.08, 78.14; 369/54

(56) References Cited

U.S. PATENT DOCUMENTS

| | | | | |
|---|---|---|---|---|
| 4,914,530 A | * | 4/1990 | Graham et al. ............... | 360/48 |
| 5,233,584 A | * | 8/1993 | Kulakowski et al. ..... | 369/44.27 |
| 5,241,531 A | * | 8/1993 | Ohno et al. ............... | 369/275.2 |
| 5,357,381 A | * | 10/1994 | Yasuda et al. ................. | 360/53 |
| 5,777,813 A | * | 7/1998 | Sun et al. ..................... | 360/66 |
| 5,784,216 A | * | 7/1998 | Zaharris ....................... | 360/48 |
| 5,930,825 A | * | 7/1999 | Nakashima et al. ........ | 711/163 |
| 5,940,255 A | | 8/1999 | Uwabo et al. | |

FOREIGN PATENT DOCUMENTS

JP        8-45192        2/1996

\* cited by examiner

Primary Examiner—Alan T. Faber
(74) Attorney, Agent, or Firm—Frishauf, Holtz, Goodman, Langer & Chick, P.C.

(57) ABSTRACT

In a large-capacity FD comprising a disk-shaped recording medium on which a plurality of tracks are arranged with concentric circles, each track is divided into a predetermined number of sectors having a length equal to one another. Each sector consists of a serve field and a data field. The servo field in each sector includes a sector number field in which a sector number and alternation contents of the magnetic disk medium are written and a track number field in which a track number is written. The sectors on each track may be assigned with serial sector numbers in a circumferential direction in order with skipping over any defective sector. The plurality of tracks may be separated in a radial direction into a plurality of zones each including at least one alternate track. The plurality of tracks may be separated in a radial direction into a user data area and an alternate area which has an information identification sector for storing historic information in respect to preparation of the disk-shaped recording medium.

4 Claims, 20 Drawing Sheets

DISK-SHAPED RECORDING MEDIUM AND FORMATTING METHOD THEREOF WHEREIN HISTORIC INFORMATION INCLUDING A STORAGE CAPACITY OF THE DISK-SHAPED RECORDING MEDIUM IS RECORDED THEREON

BACKGROUND OF THE INVENTION

This invention relates to a magnetic recording medium such as a flexible or floppy disk (which may be abbreviated to "FD") for use in a removable type magnetic recording/reproducing device such as a flexible or floppy disk drive (which may be abbreviated to "FDD") and a format method thereof.

As is well known in the art, the FDD of the type described is a device for carrying out data recording and reproducing operations to and from a magnetic disk medium of the FD loaded therein. In recent years, the FDs have been more and more improved to have a larger storage capacity. Specifically, development has been made of FDs having a storage capacity of 128 Mbytes (which may be called large-capacity FDs) in contrast with FDs having a storage capacity of 1 Mbyte or 2 Mbytes (which may be called small-capacity FDs). Following such development, the FDDs have also been improved to accept the large-capacity FDs for data recording and reproducing operations to and from the magnetic disk media of the large-capacity FDs. Furthermore, the large-capacity FDs have been more improved to have a larger storage capacity of 256 Mbytes, 512 Mbytes, . . . , and so on.

Throughout the present specification, FDDs capable of recording/reproducing data for magnetic disk media of the large-capacity FDs alone will be referred to high-density exclusive type FDDs. On the other hand, FDDs capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs will collectively be called high-density type FDDS.

The low-density exclusive type FDD and the high-density type FDD are different in mechanism from each other in several respects, one of which will presently be described. In either FDD, a magnetic head is supported by a carriage which is driven by a drive arrangement to move in a predetermined radial direction with respect to the magnetic disk medium of the FD loaded in the FDD. The difference resides in the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made with respect to the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the carriage in the predetermined radial direction.

Another difference between the low-density exclusive type FDD and the high-density type FDD resides in the number of revolutions of a spindle motor for rotating the magnetic disk medium of the FD loaded therein. More specifically, the low-density exclusive type FDD may rotate the magnetic disk medium of the small-capacity FD loaded therein at a low rotation speed of either 300 rpm or 360 rpm. On the other hand, the high-density type FDD can admit, as the PD to be loaded thereinto, either the large-capacity FD alone or both of large-capacity FD and the small-capacity FD. As a result, when the large-capacity FD is loaded in the high-density type FDD, the spindle motor for the high-density type FDD must rotate the magnetic disk medium of the large-capacity FD loaded therein at a high rotation speed of 3600 rpm which is equal to ten or twelve times as large as that of the small-capacity PD.

In the meanwhile, the large-capacity FD generally has an external configuration identical with that of the small-capacity PD. Specifically, both of the large-capacity and the small-capacity FDs have a flat rectangular shape of a width of 90 mm, a length of 94 mm, and a thickness of 3.3 mm in case of a 3.5 -inch type. However, the large-capacity FD has a narrower track width (track pitch) than that of the small-capacity FD. As a result, it is difficult for the large-capacity FD to position a magnetic head of the high-density type FDD on a desired track in the magnetic disk medium thereof in contrast with the small-capacity FD. Accordingly, a servo signal for position detection is preliminarily written in the magnetic disk medium of the large-capacity FD.

In addition, it is necessary for the high-density/low-density compatible type FDD to identify and detect whether the FD loaded therein is the large-capacity FD or the small-capacity PD.

An FD about to be manufactured (which will be called a raw FD) comprises merely a magnetic disk medium having both surfaces coated with magnetic material. In order to enable to make the raw FD useable for an electronic device such as a personal computer or a word processor, it is necessary for the raw FD to partition the magnetic disk medium into a plurality of regions with addresses and to record and manage what information should be written in each region. Such a sequence of processing steps is called a format(ting) or an initialization.

In general, the FD comprises the magnetic disk medium on which a plurality of tracks which are arranged with concentric circles around a center of rotation thereof. The tracks may be arranged in a swirl fashion around the center of rotation. Each track is divided in a circumferential direction into a predetermined number of sectors having a length equal to one another.

The formatting is classified into a physical formatting and a logical formatting. The physical formatting determines how data is arranged on the magnetic disk medium. Specifically, the physical formatting determines the total tracks, the total usable tracks, the number of sectors in each track, a medium storage capacity, a format storage capacity, and so on. On the other hand, the logical formatting determines locations where information corresponding to table of contents is written on the magnetic disk medium and assigns addresses to units each of which writes information. The logical formatting is also called a sector formatting.

In the sector formatting, each sector is partitioned into a servo field and a data field. Each sector includes at least a number field indicative of a position thereof and a sector timing mark field for notifying the number field. The number field comprises a sector number field on which a sector number is written and a track number field on which a track number is written. In a conventional sector-formated FD, the sector timing mark field is included in the data field and therefore the number field is also included in the data field. As a result, the data region has a restricted amount for writable data in the sector-formatted FD. Inasmuch as the number field is included in the data field, it is necessary to mask the number field so that any user cannot see it. In addition, procedure and processing become complicated after reading of information out of the data field in the sector. Furthermore, the conventional sector-formated FD has no space for storing alteration contents of the magnetic disk medium.

In addition, the sector formatting is performed by using a servo writer and a media formatter. The servo writer partitions first each sector into the servo field and the data field to write the above-mentioned servo signal in the servo field. In this event, the sectors on each track are assigned with sector numbers in the circumferential direction in order. Thereafter, the media formatter carries out test of the sector format and preparation of a defective map. Specifically, since all of the tracks on the magnetic disk medium cannot be used by a user, an area available to the user is restricted. Such an area is referred to as a user data area. Tracks other than the user data area are used as alternate tracks for alternate sectors for replacing defective sectors in the user data area. Such an area for the alternate tracks is an alternate area. The alternate area is generally disposed in the magnetic disk medium in the radial direction inward. In addition, separation of the tracks into the user data area and the alternate area is carried out by the physical formatting. The media formatter first performs test of the sector format to detect the defective sectors on the user data area. Subsequently, the media formatter carries out rearrangement of the sectors except for the defective sectors. Thereafter, the media formatter prepares a defective map. The defective map is a table for entering information indicating where the defective sectors on the user data area are arranged to which alternate sectors in the alternate area. The defective map is stored in a predetermined sector in the alternate area. If the storage capacity of a sector-formatted FD is less than a predetermined specification storage capacity due to the presence of a lot of defective sectors, the sector-formatted FD is discarded because the sector-formatted FD cannot be used.

However, inasmuch the alternate area disposed in the magnetic disk medium in the radial direction inward is used as the alternate sector for the defective sector, it is necessary to move a magnetic head to seek for the alternate sector in the alternate area. As a result, it has a disadvantage in that it takes a long time for accessing the alternate sector.

In order to resolve the above-mentioned disadvantage, a method of setting an alternating sector on every track of the user data area is proposed, for example, in Japanese Unexamined Patent Publication of Tokkai No. Hei 8-45192 or JP-A 8-45192 published on Feb. 16, 1996 which is hereby incorporated herein by reference. In the above-mentioned publication, the alternate sector is set for every track of a disk-shaped recording medium. When a defective sector occurs or is generated, alternate processing is carried out by rearranging the sectors. It is therefore possible to shorten a time required for alternate. Specifically, the rearrangement of the sectors is carried out, as a process starting point, the point after a point where the defective sector is generated.

However, inasmuch as the alternate sector is set for every track regardless of the presence or absence of the defective sector in the above-mentioned publication, problem of degradation in recording efficiency for data arises. In addition, inasmuch as the number of the alternate sectors set in every track is predetermined, it is inevitable that the alternate area is used as the alternate sectors when the defective sectors larger in number than the predetermined number occur in a certain track. In this event, it takes a long time to access the alternate sectors. In other words, it takes a long time to write/read data to/from the disk-shaped recording medium.

As described above, there are various types of the large-capacity FDs so as to have the storage capacity of 128 Mbytes or 256 Mbytes. Throughout the present specification, the large-capacity FD having the storage capacity of 128 Mbytes is called a single-density large-capacity FD while the large-capacity FD having the storage capacity of 256 Mbytes is called a double-density large-capacity FD. Although each of the single-density large-capacity FD and the double-density large-capacity FD has the same line recording density, the same sector format (servo format), and the same number of disk revolution, the single-density large-capacity FD and the double-density large-capacity FD have different track densities from each other. That is, the double-density large-capacity FD has the track density twice as large as that of the single-density large-capacity FD. In addition, the high-density type FDDs capable of recording/reproducing data for magnetic disk media of the single-density large-capacity FDs will be referred to as single-density large-capacity type FDDs. On the other hand, the high-density type FDs capable of recording/reproducing data for magnetic disk media of the double-density large-capacity FDs will be referred to as double-density large-capacity type FDDs.

It is assumed that data are read from the magnetic disk medium of the double-density large-capacity FD by the magnetic head of the single-density large-capacity type FDD. In this event, an output level of the read data is a half of that obtained when data on the magnetic disk medium of the single-density large-capacity FD is read by the magnetic head of the single-density large-capacity type FDD. In addition, it is assumed that data are read from the magnetic disk medium of the single-density large-capacity FD by the magnetic head of the single-density large-capacity type FDD. In this event, an output level of the read data is equivalent to that obtained when data on the magnetic disk medium of the double-density large-capacity FD are read by the magnetic head of the double-density large-capacity type FDD.

On the other hand, it is assumed that data are written in the magnetic disk medium of the double-density large-capacity FD by the magnetic head of the single-density large-capacity type FDD. In this event, a recording level of the data is lower than that obtained when data on the magnetic disk medium of the single-density large-capacity FD are written by the magnetic head of the single-density large-capacity type FDD. In addition, it is presumed that data are written in the magnetic disk medium of the single-density large-capacity FD by the magnetic head of the double-density large-capacity type FDD. In this event, a recording level of the data is equivalent to that obtained when data on the magnetic disk medium of the double-density large-capacity FD are written by the magnetic head of the double-density large-capacity type FDD.

However, once data are written in the magnetic disk medium of the single-density large-capacity FD by the magnetic head of the double-density large-capacity type FDD, the data on the magnetic disk medium of the single-density large-capacity FD only have a recording level equivalent to that of the magnetic disk medium of the single-density large-capacity FD. As a result, when the data on the magnetic disk medium of the single-density large-capacity FD are read by the magnetic head of the single-density large-capacity type FDD, the read data have an output level which is a half of a normal output level. Accordingly, reading of data on the magnetic disk medium of the single-density large-capacity FD by the double-density large-capacity type FDD is no problem, but writing of data on the magnetic disk medium of the single-density large-capacity FD by the double-density large-capacity type FDD is a problem. It is therefore necessary to make the double-density large-capacity type FDD have compatibility of reproduction for the single-density large-capacity FD alone.

In view of such necessity, it is necessary for the high-density type FDD to determine which type the large-capacity FD loaded therein belongs to.

In order to cope with the above-mentioned problem, a large-capacity flexible disk is proposed and disclosed in U.S. patent application Ser. No. 08/854,983, filed May 13, 1997 (now U.S. Pat. No. 5,940,255), entitled "LARGE-CAPACITY FLEXIBLE DISK AND HIGH-DENSITY TYPE DISK DRIVE USED THEREFOR", in the name of Tsuneo Uwabo and three others (which was assigned to the present assignee, Mitsumi Electric Co., Ltd.). In the large-capacity flexible disk disclosed in the above-referenced U.S. patent, a case accommodating the magnetic disk medium of the large-capacity FD is provided not only with a large-capacity identifier hole or notch for discriminating the large-capacity FD from a different-capacity FD but also with selectively formed type identifier holes or notches for identifying the type of the large-capacity FD. In addition, it is also disclosed in the above-referenced U.S. patent to provide not only a large-capacity detecting switch for detecting the presence or absence of the above-mentioned large-capacity identifier hole or notch but also type detecting switches for detecting the presence or absence of the type identifier holes or notches.

However, the above-proposed high-density type FDD is disadvantageous in that a lot of parts are required because the high-density type FDD must be provided with the type detecting switches for detecting the type of the large-capacity FD.

In addition, in spite of the large-capacity FDs having the same storage capacity, manufactured large-capacity FDs may have a few different specification for every media makers for manufacturing the large-capacity FDs. In an extreme case, it may happen that the specification of the manufactured large-capacity FD does not satisfy prescribed conditions. Accordingly, it is desirable that the high-density type FDD cannot access the large-capacity FD having the specification that does not the prescribed conditions. In other words, if the high-density type FDD cannot access the large-capacity FD loaded therein because the large-capacity FD is poor, it is desirable that information clue to cause of the poor (hereinafter called poor clue information) is preliminarily stored in the large-capacity FD.

SUMMARY OF THE INVENTION

It is therefore an object of this invention to provide a large-capacity flexible disk and a formatting method which are capable of writing a large amount of data in comparison with a conventional large-capacity flexible disk.

It is another object of this invention to provide a large-capacity flexible disk and a formatting method thereof, which are capable of reading information out of a data field without a complicated processing.

It is still another object of this invention to provide a large-capacity flexible disk and a formatting method thereof, in which procedure and processing become easy after reading of information out of a sector.

It is yet another object of this invention to provide a large-capacity flexible disk and a formatting method thereof, which are capable of recognizing alternation contents of a magnetic disk medium of the large-capacity flexible disk in a high-density type flexible disk drive.

It is an object of this invention to provide a disk-shaped recording medium for use in a removable type recording/reproducing device, a sector-formatting method thereof, and a recording/reproducing method, which are capable of accessing at a short time.

It is another object of this invention to provide a disk-shaped recording medium for use in a removable type recording/reproducing device, a sector-formatting method thereof, and a recording/reproducing method, which have a high recording efficiency for data.

It is an object of this invention to provide a disk-shaped recording medium for use in a removable type recording/reproducing device, which is capable of writing/reading data to/from the disk-shaped recording medium in a short time.

It is an object of this invention to provide a disk-shaped recording medium for use in a removable type recording/reproducing device and a sector-formatting method thereof, which are capable of detecting a type of the medium without increase in parts of the removable type recording/reproducing device.

It is another object of this invention to provide a disk-shaped recording medium for use in a removable type recording/reproducing device and a sector-formatting method thereof, which are capable of recognizing poor clue information in the removable type recording/reproducing device.

According to a first aspect of the present invention, a large-capacity flexible disk comprises a disk-shaped magnetic disk medium on which a plurality of tracks are arranged with concentric circles. Each track is divided in a circumferential direction into a predetermined number of sectors having a length equal to one another. Each sector consists of a servo field and a data field. Each sector includes a number field indicative of a position thereof and a sector timing mark field for notifying the number field. The servo field comprises the sector timing mark field and the number field following the sector timing mark field. The number field includes a space for storing alteration contents of the disk-shaped magnetic disk medium.

According to a second aspect of the present invention, a method of formatting a large-capacity flexible disk comprising a disk-shaped magnetic disk medium comprising: a physical formatting step of arranging a plurality of tracks on the disk-shaped magnetic disk medium with concentric circles and of dividing each track in a circumferential direction into a predetermined number of sectors; and a sector formatting step of partitioning each sector into a servo field and a data field and of making the servo field include a sector timing mark field and a number field indicative of a position thereof following the sector timing mark field. The number field includes a space for storing alteration contents of the disk-shaped magnetic disk medium.

According to a third aspect of the present invention, a disk-shaped recording medium is for use in a removable type recording/reproducing device for loading and unloading the disk-shaped recording medium to be accessed. The disk-shaped recording medium comprises a plurality of tracks thereon which are arranged with concentric circles or a spiral fashion around a center of rotation thereof. Each track is divided in a circumferential direction into a predetermined number of sectors having a length equal to one another. The sectors on each track are assigned with serial sector numbers in the circumferential direction in order with skipping over any defective sector.

According to a fourth aspect of the present invention, a method is of sector-formatting a disk-shaped recording medium for use in a removable type recording/reproducing device for loading and unloading the disk-shaped recording medium to be accessed. The method is carried out after a physical formatting of arranging a plurality of tracks on the disk-shaped recording medium with concentric circles or a spiral fashion around a center of rotation thereof, and of dividing each track in a circumferential direction into a predetermined number of sectors. The method comprises the steps of: partitioning each sector into a servo field and a data field to write a servo signal in the servo field; performing test of a sector format to detect defective sectors; and assigning the sectors on each track with serial sector numbers in the circumferential direction in order with skipping over the defective sectors, thereby carrying out rearrangement of the sectors except for the defective sectors.

According to a fifth aspect of the present invention, a method is of carrying out data recording and reproducing operation to and from a disk-shaped recording medium for use in a removable type recording/reproducing device for loading and unloading the disk-shaped recording medium to be accessed. The disk-shaped recording medium comprises a plurality of tracks thereon which are arranged with concentric circles or a spiral fashion around a center of rotation thereof. Each track is divided in a circumferential direction into a predetermined number of sectors having a length equal to one another. The method comprises the step of, on reading/writing data from/to the sectors on each track in the circumferential direction in order, sequentially performing reading/writing of data with skipping over any defective sector.

According to a sixth aspect of the present invention, a disk-shaped recording medium is for use in a removable type recording/reproducing device for loading and unloading the disk-shaped recording medium to be accessed. The disk-shaped recording medium comprises a plurality of tracks thereon which are arranged with concentric circles or a spiral fashion around a center of rotation thereof. Each track is divided in a circumferential direction into a predetermined number of sectors having a length equal to one another. The plurality of tracks are separated in a radial direction into a plurality of zones each of which consists of a plurality of tracks. Each zone includes at least one alternate track.

According to a seventh aspect of the present invention, a disk-shaped recording medium is for use in a removable type recoding/reproducing device for loading and unloading the disk-shaped recording medium to be accessed. The disk-shaped recording medium comprises a plurality of tracks thereon which are arranged with concentric circles or a spiral fashion around a center of rotation thereof. Each track is divided in a circumferential direction into a predetermined number of sectors having a length equal to one another. The plurality of tracks are separated into a user data area which is available to a user and an alternate area other than the user data area. The alternate area has a specific sector which is an information identification sector for storing historic information in respect to preparation of the disk-shaped recording medium.

According to an eighth aspect of the present invention, a method is of sector-formatting a disk-shaped recording medium for use in a removable type recording/reproducing device for loading and unloading the disk-shaped recording medium to be accessed. The method is carried out after a physical formatting: of arranging a plurality of tracks on the disk-shaped recording medium with concentric circles or a spiral fashion around a center of rotation thereof; of dividing each track in a circumferential direction into a predetermined number of sectors; and of separating the plurality of tracks into a user data area which is available to a user and an alternate area other than the user data area. The method comprises the steps of: partitioning each sector into a servo field and a data field to write a servo signal in the servo field; performing test of a sector format to detect defective sectors on the user data area; carrying out rearrangement of sectors except for the defective sectors; preparing a defective map entering information indicating where the defective sectors on the user data area are arranged to the alternate area to store the defective map in a predetermined sector in the alternate area; and storing historic information in respect to preparation of the disk-shaped recording medium in an information identification sector which is a specific sector in the alternate area.

DESCRIPTION OF THE PREFERRED EMBODIMENTS

Figure 1:
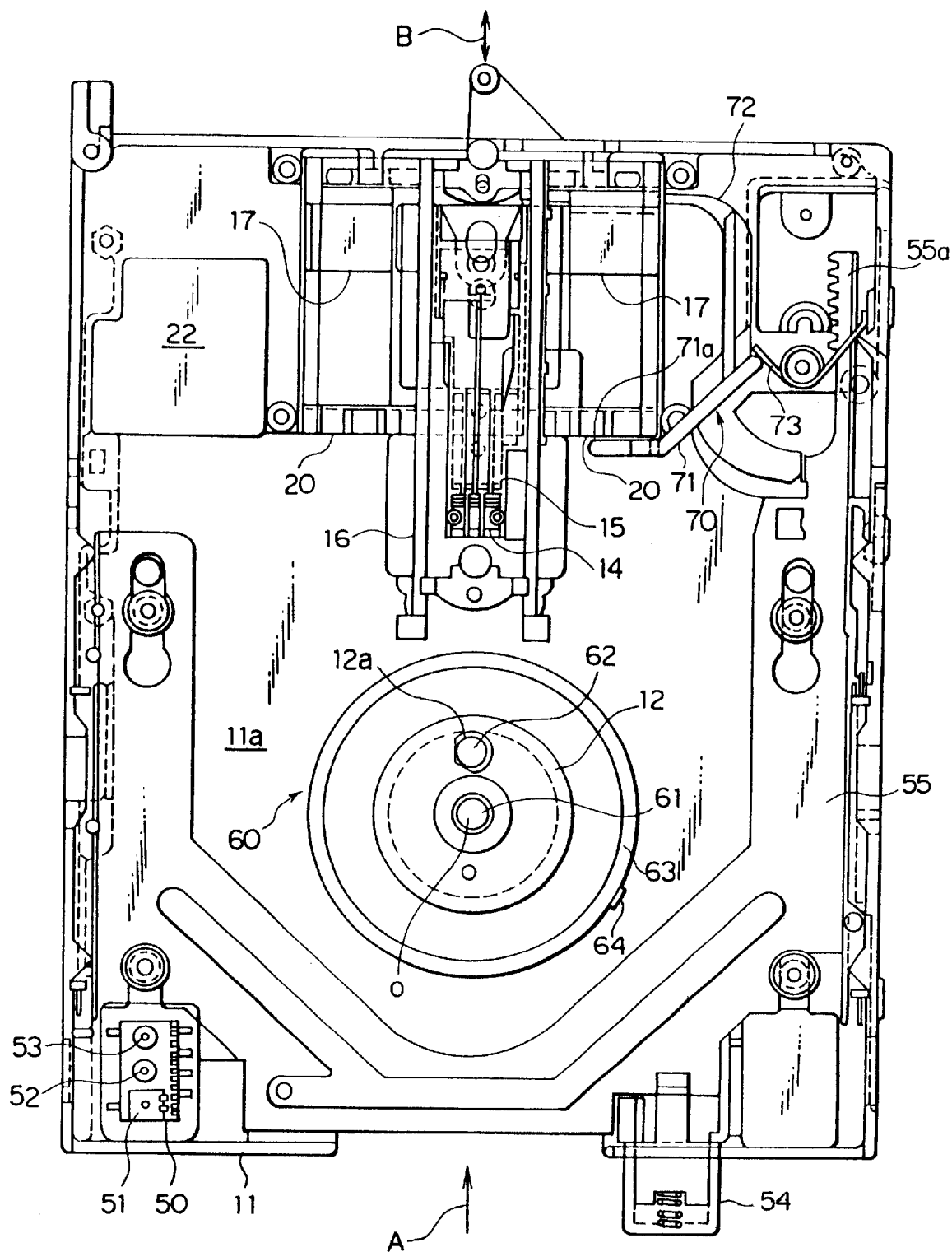
FIG. 1 is a plan view of a high-density type flexible disk drive (FDD) to which this invention is applicable.

Referring to FIG. 1, description will proceed to a high-density type flexible disk drive (FDD) to which this invention is applicable. The illustrated high-density type FDD is a high-density/low-density compatible type FDD which enables to carry out recording/reproducing of data for magnetic disk media of both a large-capacity and a small-capacity flexible disks (FDs) which will later be described. The FD is loaded into the high-density type FDD from an insertion direction indicated by an arrow A in FIG. 1. FIG. 1 shows a state where the FD is loaded into the high-density type FDD. The FD has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The loaded FD is held on the holder disk table 12 so that the table center axis O coincides with the disk center axis. The disk holder table 12 is rotatably driven by a spindle motor (SPM) 60. The spindle motor 60 is mounted on the main frame 11 with the spindle motor 60 put into a state embedded in a concave portion (not shown) of the main frame 11, thereby the magnetic disk medium of the FD rotates at a desired rotation speed in the manner which will become clear. In addition, the main frame 11 has a back surface (not shown) on which a printed-circuit board 22 is mounted. A number of electronic parts (not shown) are mounted on the printed-circuit board 22.

As shown in FIG. 1, the spindle motor 60 is mounted on the main surface 11a with the spindle motor embedded in the concave portion of the main frame 11. The spindle motor 60 comprises a spindle shaft 61 which is rotatably supported with respect to the main frame 11 via a ball bearing (not shown) substantially perpendicular to the main surface 11a of the main frame 11. The spindle shaft 61 serves as the axis O of the rotation for the magnetic disk medium of the FD loaded in the high-density type FDD. The disk table 12 is fixed to the spindle shaft 61 at an upper portion thereof. The disk holder table 12 has a main surface which extends to a direction perpendicular to a longitudinal direction (a direction of the axis O of the rotation) of the spindle shaft 61.

That is, the disk holder table 12 is rotatably supported on the main surface 11a of the main frame 11 and holds the FD loaded in the high-density type FDD so that the table center axis O (the axis of the rotation) coincides with the disk center axis of the FD.

Figure 2A:
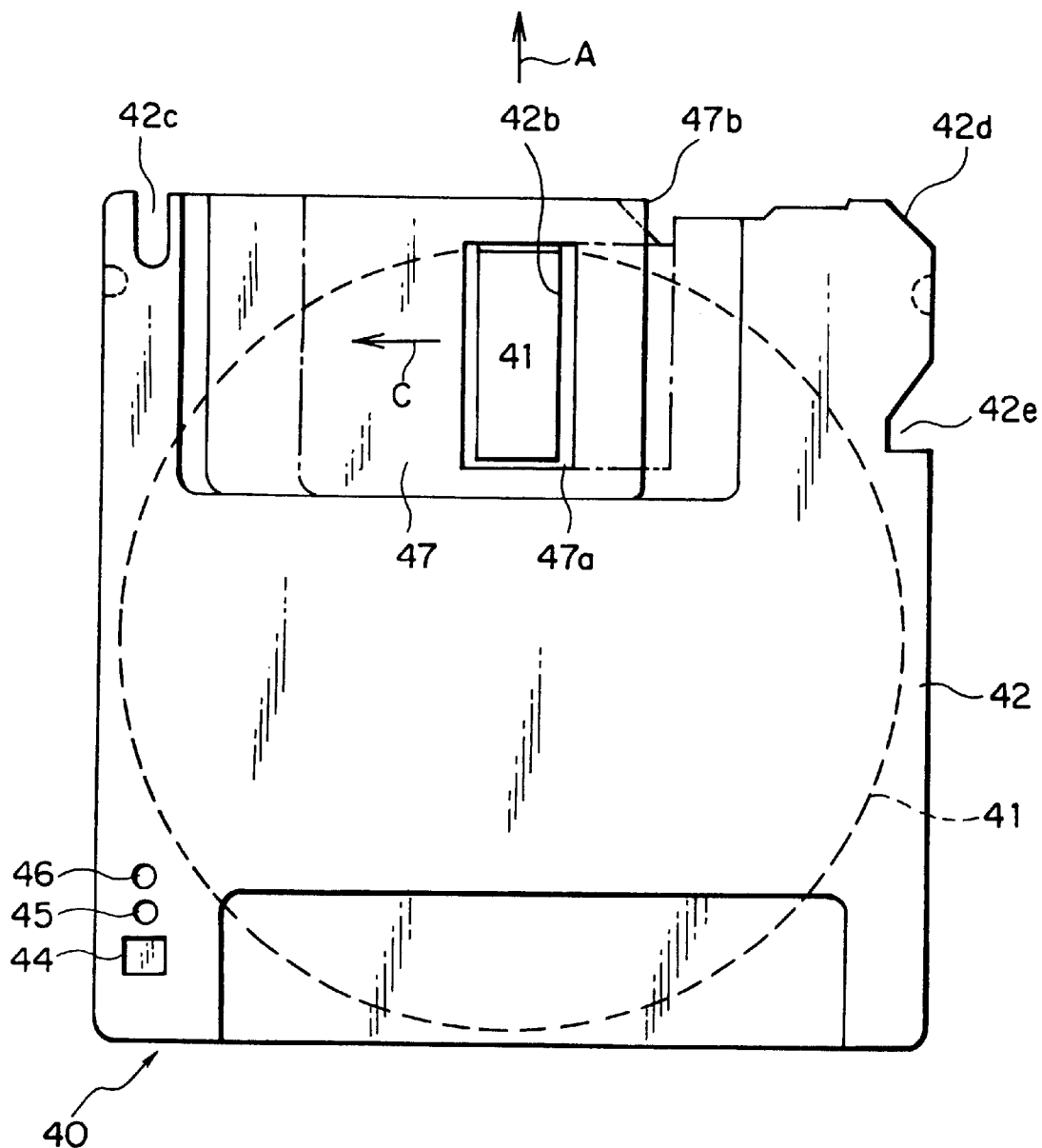
FIGS. 2A and 2B collectively show a large-capacity flexible disk (FD) loaded in the high-density type FDD illustrated in FIG. 1.
Figure 2B:
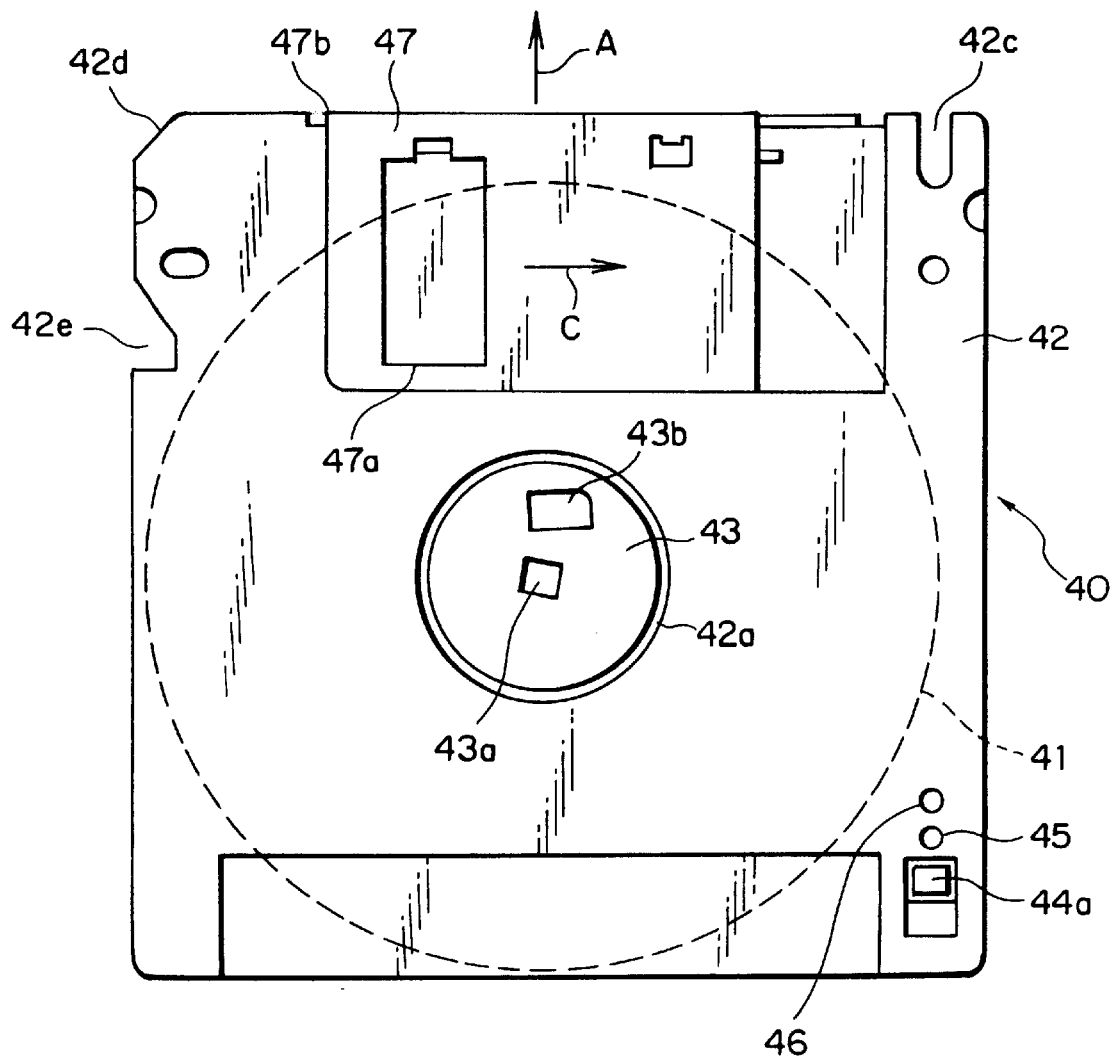

Turning to FIGS. 2A and 2B, description will proceed to the large-capacity FD depicted at 40. FIG. 2A is a plan view of the large-capacity FD 40 as seen from an upper surface side while FIG. 2B is a bottom view of the large-capacity FD 40 as seen from a lower surface side. The illustrated large-capacity FD 40 is a 3.5-inch type and comprises a magnetic disk medium 41 serving as a disk-shaped recording medium, and a shell or a case 42 for receiving or covering the magnetic disk medium 41. The shell 42 consists of an upper shell or case (FIG. 2A) having the upper surface and a lower shell or case (FIG. 2B) having the lower surface.

As shown in FIG. 2B, in the lower surface of the shell 42, a circular aperture 42a is formed at a center portion of the large-capacity FD 40. In the circular aperture 42a is freely received a disk hub (a disk-shaped metal) 43 for holding the magnetic disk medium 41. The disk hub 43 has a disk center hole 43a at a center portion thereof and a chucking hole (a disk driving oval hole) 43b at a position eccentric with the center position thereof. The disk center hole 43a has substantially a rectangular shape and receives the spindle shaft 61 (FIG. 1) therein in the manner which later be described. The chucking hole 43b freely receives a chucking pin or a drive roller 62 (FIG. 1) therein in the manner which will also later be described.

Turning back to FIG. 1 again in addition to FIG. 2A, the disk holder table 12 has a diameter which is longer than that of the disk hub 43 and which is shorter than that of the circular aperture 42a of the shell 42.

The disk holder table 12 has a table driving oval hole 12a at a position corresponding to the chucking hole (the disk driving oval hole) 43b. Through the table driving oval hole 12a, the chucking pin (the drive roller) 62 is freely received in the chucking hole 43b of the FD 40 in the manner which will later become clear. The disk holder table 12 is mounted on a magnetic case 63 at a bottom surface thereof. The chucking pin 62 is rotatably and movably mounted in the magnetic case 63 with the chucking pin 62 urged upwardly. Accordingly, the chucking pin 63 moves downwardly or sinks in the disk holder table 12 if any load is applied to the chucking pin 63 downwards. The magnetic case 63 comprises a circumferential wall which has an outer surface at a predetermined position of which an index detection magnet 64 of rectangular parallelepiped shape is fixed.

Referring to FIGS. 2A and 2B again, a write protection hole 44 is bored in the shell 42 of the large-capacity PD 40 at a corner portion in rear and right-hand side with respect to an insertion direction depicted at an arrow A of FIG. 2B as view from the lower surface of the large-capacity FD 40. In other words, the write protection hole 44 is bored in the shell 42 of the large-capacity FD 40 at the corner portion in rear and left-hand side in the insertion direction A of FIG. 2A as viewed from the upper surface of the large-capacity FD 40. FIG. 2B shows a state where the write protection hole 44 is shut by a write protection tab 44a. The write protection tab 44a enables to slide along a direction in parallel with the insertion direction A. It is possible to carry out opening and closing of the write protection hole 44 by operating the write protection tab 44a manually. When the write protection hole 44 is closed by the write protection tab 44a, the large-capacity FD 40 is put into a write enable state. When the write protection hole 44 is opened by the write protection tab 44a, the large-capacity FD is put into a write disable state.

The illustrated large-capacity FD 40 shows a case where there is two types of storage capacity of, for example, 128 Mbytes and 256 Mbytes. In the vicinity of the write protection hole 44, a large-capacity identifier hole 45 is bore in the shell 42 of the large-capacity FD 40. The large-capacity identifier hole 45 is for identifying the large-capacity FD 40 in distinction from the small-capacity FD. In addition, a type identifier hole 46 is selectively bored in the shell 42 of the large-capacity FD 40 near the write protection hole 44 together with the large-capacity identifier hole 45. The type identifier hole 46 is for identifying a type of the large-capacity FD 40. It is possible to identify the type of the large-capacity FD 40 according to the presence or absence of the type identifier hole 46. It is assumed that the large-capacity FD 40 having the storage capacity of 128 Mbytes is referred to as a first type of the large-capacity FD while the large-capacity FD 40 having the storage capacity of 256 Mbytes is referred to as a second type of the large-capacity FD. In the example being illustrated, the type identifier hole 46 is not bore in the shell 42 of the first type of the large-capacity FD while the type identifier hole 46 is bored in the shell 42 of the second type of the large-capacity PD.

Although illustration is omitted, as is well known in the art, the large-capacity identifier hole 45 and the type identifier hole 46 are not bored in a shell or case of the small-capacity FD.

Turning back to FIG. 1 in addition to FIG. 2A and 2B, on the printed-circuit board 22 mounted on the back surface of the main frame 11, the high-density type FDD further comprises a switch unit 50 at a corner position in rear and left-hand side with respect to the insertion direction A. The switch unit 50 comprises a plurality of push switches which will presently be described. The switch unit 50 is for detecting the presence or absence of the write protection hole 44, the large-capacity identifier hole 45, and the type identifier hole 46.

More specifically, the switch unit 50 comprises, as the push switches, a write control switch 51, a large-capacity detecting switch 52, and the type detecting switch 53. The write control switch 51 is a push switch for detecting the opening or closing state of the write protection hole 44. The control switch 51 is disposed at a position corresponding to the write protection hole 44 when the large-capacity FD 40 is loaded in the high-density type FDD. The large-capacity detecting switch 52 is a push switch for detecting whether the loaded FD is the large-capacity FD or the small-capacity FD. The large-capacity detecting switch 52 is disposed at a position corresponding to the large-capacity identifier hole 45 when the large-capacity FD 40 is loaded in the high-density type FDD. The type detecting switch 53 is a push switch for detecting the presence or absence of the type identifier hole 45. The type detecting switch 53 is disposed at a position corresponding to the type identifier hole 46 when the large-capacity FD 40 is loaded in the high-density type FDD.

Although illustration is omitted, a stator (not shown) of the spindle motor 60 comprises a frequency generation pattern (which is abbreviated an FG pattern hereinafter) for detecting the rotation speed thereof. The FG pattern generates an FG signal having pulses which in number to sixty during one rotation of the spindle motor 60. As is well known in the art, 300 rpm is equivalent to 5 Hz/rev while 3600 rpm is equivalent to 60 Hz/rev. As a result, the FG pattern generates the FG signal having a frequency of 300 Hz if the magnetic disk medium of the small-capacity FD rotates at its prescribed rotation speed of 300 rpm by the spindle motor 60. Likewise, the FG pattern generates the FG signal having a frequency of 3600 Hz if the magnetic disk medium of the large-capacity FD 40 rotates at its prescribed rotation speed of 3600 rpm by the spindle motor 60.

As shown in FIGS. 2A and 2B, the large-capacity FD 40 further comprises a shutter 47 at a front side thereof. The shutter 47 is slidable in a direction depicted at C in FIGS. 2A and 2B. The shutter 47 is provided with a window 47a. The shutter 47 is urged by a spring (not shown) in a direction reverse to the direction C. When the shutter 47 makes sliding movement in the direction C, the window 47a of the shutter 47 is faced to an opening 42b formed in the shell 42. At this time. it is possible to access the magnetic disk medium 41 by upper and lower magnetic heads (not shown) through the opening 42b.

Turning back to FIG. 1, the high-density type FDD includes a shutter drive mechanism for opening and closing the shutter 47 of the large-capacity FD 40, an ejector mechanism for ejecting the large-capacity FD 40, and a carriage locking mechanism for locking a direct-acting type carriage mechanism (which will later be described) after ejection of the large-capacity FD 40.

The high-density type FDD further comprises a lever unit 70. the lever unit 70 comprises an eject laver 71 and a lock lever 72. The eject lever 71 serves both as a component of the shutter drive mechanism for opening and closing the shutter 47 and as a component of the ejector mechanism for ejecting the large-capacity FD 40 from the high-density type FDD. The lock lever 72 is located in the vicinity of the direct-acting type carriage mechanism and serves to lock the direct-acting type carriage mechanism upon ejection of the large-capacity FD 40.

The ejector mechanism comprises an eject button 54 projecting into an outer surface of a front bezel (not shown) of the high-density type FDD, an eject plate 55 for positioning the large-capacity FD 40 loaded through an insertion slot (not shown) of the front bezel so that one surface of the large-capacity FD 40 is faced to the eject plate 55, and a pair of eject springs (not shown) having one end engaged with eject plate 55 and the other end engaged with a disk holder unit (not shown). The eject plate 55 has a rack 55a at its top end in a depth direction. The rack 55a is engaged with a pinion (not shown) rotatably supported on the main surface 11a of the main frame 11. The lever unit 70 is urged by a spring mechanism 73 in a counterclockwise direction.

It is assumed that the large-capacity FD 40 is loaded into the disk holder unit of the high-density type FDD. Specifically, when the large-capacity FD 40 is inserted in the direction depicted at the arrow A in FIG. 1, a top end 71a of the eject lever 71 is engaged an upper end 47b of a right side edge of the shutter 47. With the movement of the large-capacity FD 40, the lever unit 70 is rotated in a clockwise direction. Consequently, the shutter 47 is forced by the top end 71a of the eject lever 71 to make sliding movement in the direction depicted by the arrow C.

When the large-capacity FD 40 is completely received in the disk holder unit of the high-density type FDD, the disk holder unit comes down and then the large-capacity FD 40 is locked by a disk lock mechanism (not shown) to be stably held in the disk holder unit. In this state, engagement between side arms (not shown) of the carriage assembly and the disk holder unit is released and the window 47a of the shutter 47 is located directly above the opening 42b of the shell 42, as illustrated in FIG. 2A. Accordingly, the upper magnetic head is in contact with the magnetic disk medium 41 of the large-capacity FD 40 through the window 47a of the shutter 47 and the opening 42a of the shell 42. The shutter 47 is urged by a spring member (not shown) to be located at a position indicated by a dash-and-dot line in FIG. 2A.

The high-density type FDD comprises a pair of magnetic heads for reading/writing data from/to the magnetic disk medium 41 in the large-capacity FD 40. The magnetic heads are supported via gimbals 14 with a carriage 15. A combination of the gimbals 14 and the carriage 15 is called the carriage assembly. The carriage 15 is disposed over the main surface 11a of the main frame 11 with a space left therebetween. The carriage 15 supports the magnetic heads movably along a predetermined radial direction (i.e. a direction indicated by an arrow B in FIG. 1) with respect to the large-capacity FD 40.

The carriage 15 is supported and guided at both lower sides thereof by a pair of guide bars 16 which extend to directions in parallel with the predetermined radial direction B. The carriage assembly is driven in the predetermined radial direction B by a voice coil motor (VCM) which will later be described. As shown in FIG. 1, the carriage assembly is provided with a pair of voice coils 17 at opposite rear sides thereof. The voice coils 17 act as components of the voice coil motor.

Now, description will be made as regards the voice coil motor (VCM). The voice coil motor comprises the pair of voice coils 17 located at opposite rear side of the carriage assembly and wound around drive axes parallel to the predetermined radial direction B, and a pair of magnetic circuits 20 for producing magnetic fields intersecting electric currents flowing through the voice coils 17. In the voice coil motor of the above-mentioned structure, when the electric current is made to flow through each of the voice coils 17 in a direction intersecting the magnetic field produced by the magnetic circuit 20, a drive force is generated in an extending direction of each drive axis as a result of an interaction between the electric current and the magnetic field. The drive force causes the voice coil motor to make the carriage assembly move in the predetermined radial direction B.

Turning back to FIGS. 2A and 2B. the shell 42 has a first notch 42c formed on a forward side thereof in the insertion direction A. The shell 42 further has a second notch 42e formed on a lateral side provided with a chamfered portion 42d for preventing reverse insertion (wrong insertion in a vertical direction or in the insertion direction A). The second notch 42e has a particular shape and is formed at a particular position so that the second notch 42e is engaged by a reverse insertion preventing lever of the small-density exclusive type FDD. In other words, the shell of the small-capacity FD does not have the first and the second notches 42c and 42e.

Figure 3:
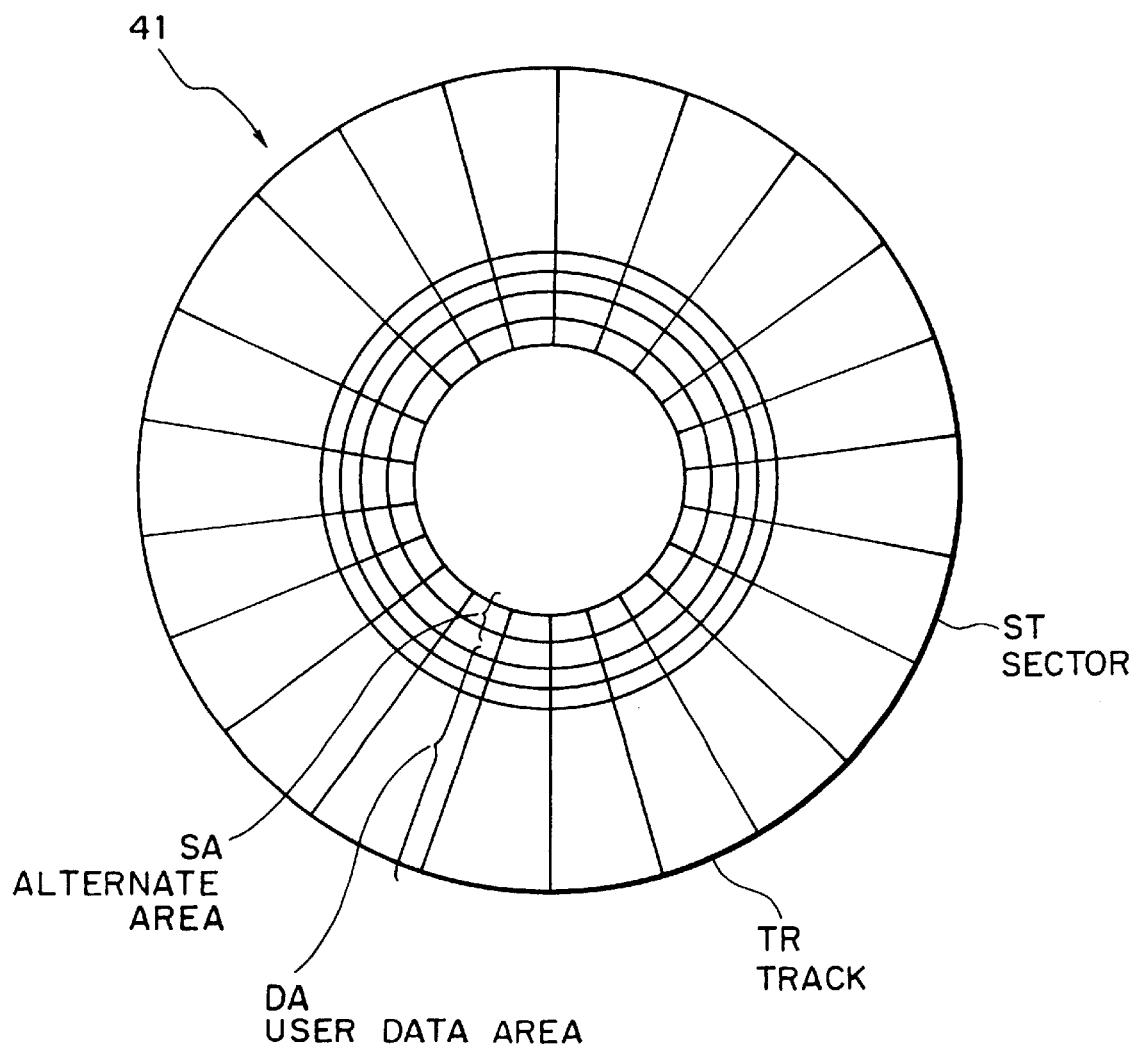
FIG. 3 is a plan view of a magnetic disk medium (a disk-shaped recording medium) according to a first embodiment of this invention for use in the large-capacity FD illustrated in FIGS. 2A and 2B.

Turning to FIG. 3, the disk-shaped magnetic disk medium or the disk-shaped recording medium 41 comprises a plurality of tracks TR thereon which are arranged with concentric circles around a center of rotation thereof. The tracks TR may be arranged with a spiral fashion around the center of rotation thereof. Each track TR is divided in a circumferential direction into a predetermined number of sectors ST having a length equal to one another. It is assumed that the large-capacity FD 40 has the storage capacity of 128 Mbytes. In this event, the large-capacity FD 40 or the disk-shaped recording medium 41 comprises the tracks TR which are equal in total number and in available total number to 1,866 and 1,564 each side, respectively. Each track TR is divided into the sectors ST which are equal in number to 80. The large-capacity FD 40 has a medium storage capacity of about 160 Mbytes in all both sides and has a format storage capacity of about 128 Mbytes in all both sides. That is, a physical format for the large-capacity FD 40 or the disk-shaped recording medium 41 arranges the tracks TR on the disk-shaped recording medium 41 with concentric circles that are equal in number to 1,564 on one side and divides each track TR into the sectors ST which are equal in number to 80.

In addition, the magnetic disk medium 41 of the large-capacity FD 40 has a medium rotation speed of 3,600 rpm.

In this connection, the magnetic disk medium of the small-capacity FD has a medium rotation speed of 300 rpm. That is, the medium rotation speed of the large-capacity FD 40 is twelve times as large as that of the small-capacity FD.

Figure 4:
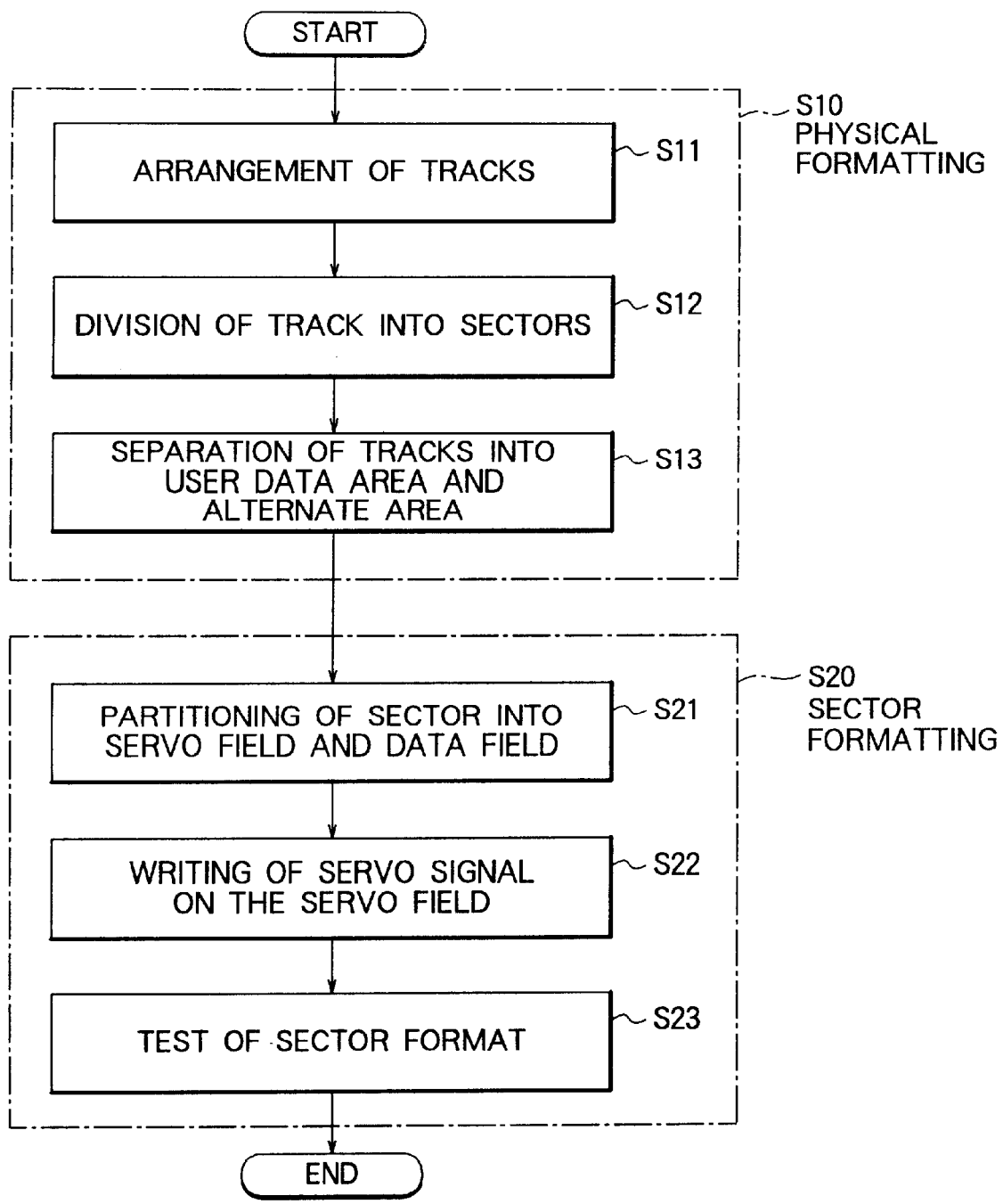
FIG. 4 is a flow chart for use in describing a formatting method for the disk-shaped recording medium illustrated in FIG. 3 according a first embodiment of this invention.
Figure 5:
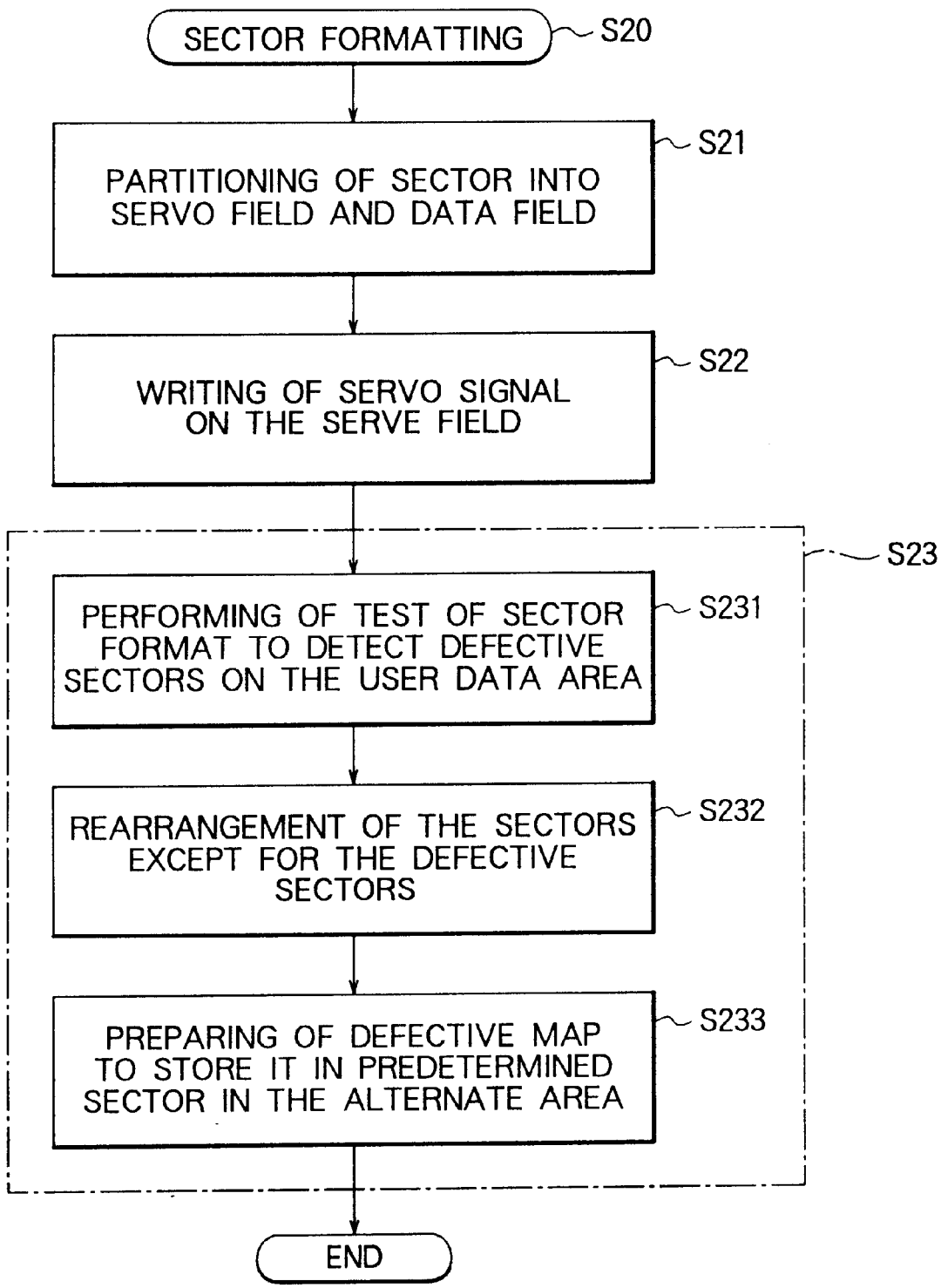
FIG. 5 is a flow chart for use in describing a sector formatting step used in the formatting method illustrated in FIG. 4.

Turning to FIGS. 4 and 5, description will proceed to a formatting method according to a first embodiment of this invention. The illustrated formatting method comprises a physical formatting step S10 and a sector formatting step S20. The physical formatting step S10 is carried out with respect to a raw FD (not shown) by the high-density type FDD. More specifically, the physical formatting step S10 comprises first through third physical formatting stages S11, S12, and S13. The first physical formatting stage S11 arranges the tracks TR on the magnetic disk medium 41 of the raw FD with concentric circles that are equal in number to 1,564 on one side. The first physical formatting stage S11 is followed by the second physical formatting stage S12. The second physical formatting stage S12 divides each track TR into the sectors ST which are equal in number to 80. The second physical formatting stage S12 is succeeded by the third physical formatting stage S13. The third physical formatting stage S13 separates the tracks TR into a user data area DA available to a user and an alternate area SA other than the user data area. The alternate area SA is disposed in the magnetic disk medium 41 in a radial direction inward as shown in FIG. 3. The alternate area SA may be disposed in the magnetic disk medium 41 in the radial direction outward.

The physical formatting step S10 proceeds to the sector formatting step S20. The sector formatting step S20 is performed by using a servo writer (not shown) and a media formatter (not shown). The sector formatting step S20 comprises first through third sector formatting stages S21, S22, and S23. At the first sector formatting stage S21, the servo writer partitions each sector ST into a servo field and a data field which will later become clear. The first sector formatting stage S21 is followed by the second sector formatting stage S22 at which the servo writer writes a servo signal on the servo field in the manner which will later be described. The second sector formatting stage S22 is succeeded by the third sector formatting stage S23 which is called a test step and which is carried out by the media formatter.

As shown in FIG. 5, the test step S23 comprises first through third test stages S231, S232, and S233. At the test stage S231, the media formatter performs test of the sector format to detect defective sectors on the user data area DA. The first test stage S231 is followed by the second test stage S232 at which the media formatter carries out rearrangement of the sectors ST except for the defective sectors. The second test stage S232 is succeeded by the third test stage S233 at which the media formatter prepares a defective map which is a table for entering information indicating where the defective sectors on the user data area DA are arranged to which alternate sectors in the alternate area SA. The defective map is stored in a predetermined sector in the alternate area.

Figure 6:
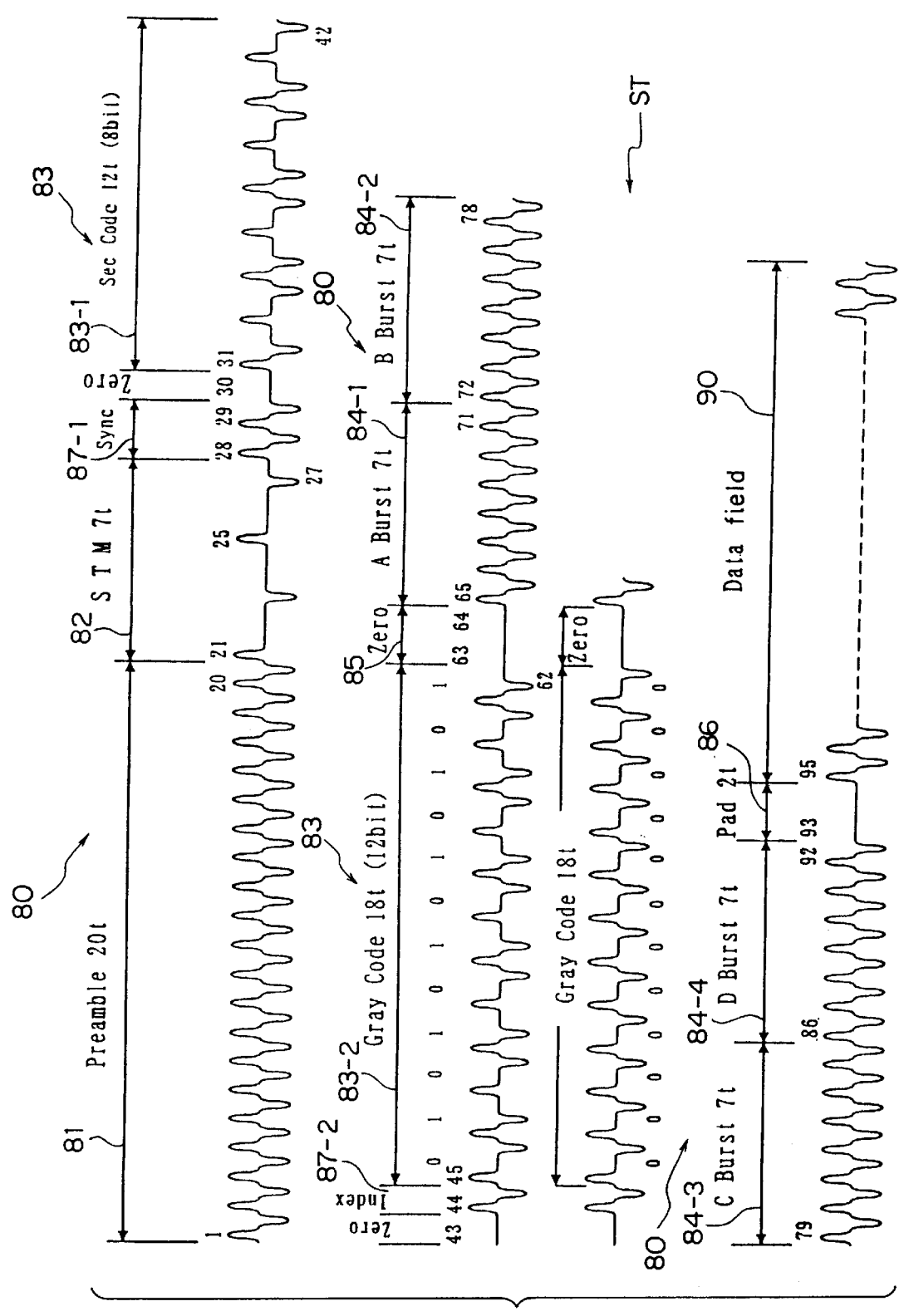
FIG. 6 shows a servo field formatted by the sector formatting step illustrated in FIG. 5.

Referring to FIG. 6, description will proceed to the sector formatting for the large-capacity FD 40 in more detail.

As shown in FIG. 6, each sector ST consists of the servo field 80 and the data field 90. The servo field 80 of the sector ST comprises a preamble field 81, a number field 83 indicative of a position of the sector ST in question, a sector timing mark (STM) field 82 for notifying the number field 82, first through fourth burst fields 84-1, 84-2, 84-3, and 84-4 for detecting position deviation, a zero field 85 for a phase matching between the number field 82 and the first burst field 84-1, and a pad field 86 for another phase matching between the fourth burst field 84-4 and the data field 90. The first through the fourth burst fields 84-1 to 84-4 are called an A burst, a B burst, a C burst, and a D burst, respectively.

The number field 83 consists of a sector number field 83-1 and a track number field 83-2. The sector number field 83-1 is for storing not only a sector number but also alteration contents (which will later become clear) of the magnetic disk medium 41. The track number field 83-2 is for storing a track number. In other words, the sector number and the alteration contents are written in the sector number field 83-1 while the track number is written in the track number field 83-2. The servo field 80 further comprises, in front of and at the rear of the sector number field 83-1, a synchronous code 87-1 and an index code 87-2 which indicate start and end of the sector number field 83-1, respectively. In the example being illustrated, a zero code is put between the the synchronous code 87-1 and the sector number field 83-1 and another zero code is put between the sector number field 83-1 and the index code 87-2. Their zero codes are codes for timing adjustment and may be omitted.

In the example being illustrated, the servo signal is written on the servo field 80 at a write-in frequency of 5 MHz. In addition, a unit time t is equal to 200 nanoseconds.

The preamble field 81 has a length of 20 t and 40flux turns (ft) appear in the preamble field 81. The number of 1, 2, ..., 20, and 21 are attached to each time instant in order and are referred to as first through twenty-first time instants, respectively. The STM field 82 has a length of 7 t and four flux turns appear in the STM field 82. As shown in FIG. 6, a time interval from the flux turn appearing at the twenty-first time instant to a next flux turn is equal to 2.5 t. The time interval of 2.5 t does not exist in other parts and it is therefore possible to notify the number field 83. The synchronous code 87-1 has a length of 2 t and the zero code following the synchronous code 87-1 has a length of 1 t. The sector number field 83-1 has a length of 12 t and is composed of eight bits. The zero code following the sector number field 83-1 has a length of 1 t. The index code 87-2 has a length of 1 t. The track number field 83-2 has a length of 18 t and is composed of twelve bits.

More specifically, the alteration contents of the magnetic disk medium 41 and the sector number are written in the sector number field 83-1 using a phase modulation and is represented by binary code. The track number is written in the track number field 83-2 using the phase modulation and is represented by Gray code.

The zero field 85 has a length of 2 t. Each of the first through the fourth burst fields 84-1 to 84-4 has a length of 7 t and fourteen flux turns appear in each of the first through the fourth burst fields 84-1 to 84-4. The pad field 86 has a length of 2 t.

As described above, the STM field 82 following the preamble field 81 is set in the servo field 80 and then the number field 83 is also set in the servo field 80. As a result, it is possible for the large-capacity FD 40 to write a large amount of data in the data field 90 in comparison with a conventional large-capacity FD. This is because the number field 83 is shifted to the servo field 80 from the data field 90 in the present invention although the number field 83 is set in the data field 90 in prior art. Accordingly, it is possible for the present invention to provide the large-capacity FD 40 having larger storage capacity in comparison with prior art. In addition, inasmuch as the number field 83 is not set in the data field 90, the data field 90 becomes free in a user. That is, it is unnecessary for the present invention to mask the number field 83 so that a user cannot see the number field 83 although it is necessary for prior art to mask the number field. Furthermore, inasmuch as the number field 83 is set in the servo field 80, it is possible to read information from the number field 83 (the track number field 83-2 and the sector number field 83-1) on reading information on the servo field 80. As a result, procedure and processing become easy after reading of information out of the sector ST.

In addition, in the example being illustrated, inasmuch as the number is written in the number field 83 using the phase modulation, it is possible for such as a sector-formatted large-capacity FD to correctly read the number written in the number field 83 although variation occurs in the large-capacity FD due to the installation and removal (loading and unloading) to the high-density type FDD.

In the fields composing the servo field 80 in each sector ST, the preamble field 81, the STM field 82, the number field 83, the zero field 85, and the pad field 86 lie in the same track but the first through the fourth burst fields 84-1 to 84-4 are shifted one another in a radial direction in the manner which will presently described. That is, the first burst field 84-1 is shifted a half track width from the track in question in the radial direction outwardly. The second burst field 84-2 is shifted the half track width from the track in question in the radial direction inwardly. The third burst field 84-3 lies in the track in question. The fourth burst field 84-4 is shifted one track width from the track in question in the radial direction outwardly. With this structure, it is possible to detect the position deviation of the magnetic head (not shown) of the high-density type FDD with respect to the track in question by shifting the first through the fourth burst fields 84-1 to 84-4 in the radial direction.

As a result, the servo field 80 has a length of (20+7+2+1+12+1+1+18+2+7+7+7+7+2)t or 94 t, namely, of 18.8 microseconds.

In the example being illustrated, the synchronous code 87-1 and the index code 87-2 are attached to the sector number field 83-1 at the front and at the rear thereof, respectively, as described above. Inasmuch as the synchronous code 87-1 is attached to the sector number field 83-1, it is possible to freely modify definition of the sector number field 83-1 which follows the synchronous code 87-1 and which is composed of eight bits. The index code 87-2 indicates the end of the sector number field 83-1 defined that is followed by the index code 87-2.

The description will proceed to the alternation contents of the magnetic disk medium 41 that is stored in the sector number field 83-1. Three types is considered as the alternation contents of the magnetic disk medium 41. A first type of the alternation contents is capacity identifier information for identifying a storage capacity of the magnetic disk medium 41. For instance, the capacity identifier information indicates, as the storage capacity, 128 Mbytes, 256 Mbytes, and so on. A second type of the alternation contents is zone identifier information for identifying zone bits. Specifically, in order to more improve the large-capacity FD to have a greater capacity, the number of sectors per track is increased as follows. The more a position in the magnetic disk medium 41 is outward in the radial direction, the more the sectors is jammed in each track of the magnetic disk medium 41 with a recording frequency variable. This recording system is called a multiple zone recording system wherein the magnetic disk medium 41 is divided in the radial direction into groups called zones from outward to inward. Each track belonging to the same zone has the sectors equal in number to each other. Each track belonging to the zone outward has the more sectors. A third type of the alternation contents is information for identifying a signal processing system called partial response maximum likelihood (PRML). The PRML is a system for demodulating a signal on the basis of a waveform pattern of a readout signal. The higher a line recording density is, the more waveforms read out of variation in magnetic flux interfere mutually. It is possible, by using the PRML, to detect the signal taking into account their effects. As a result, it is possible to improve the line recording density by about twenty percent in comparison with a conventional peak detection system.

Figure 7:
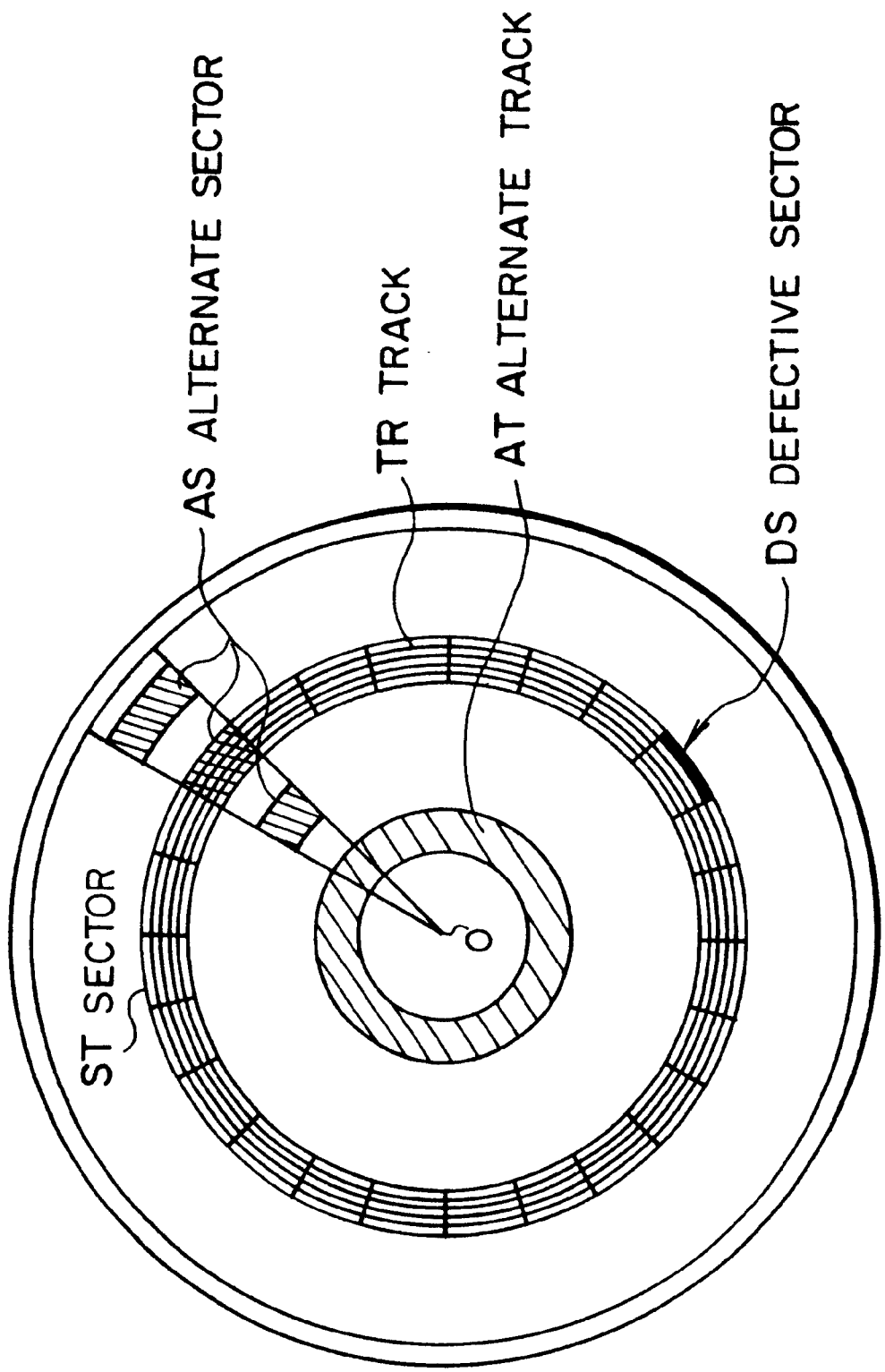
FIG. 7 is a plan view of a conventional disk-shaped recording medium.
Figure 8:
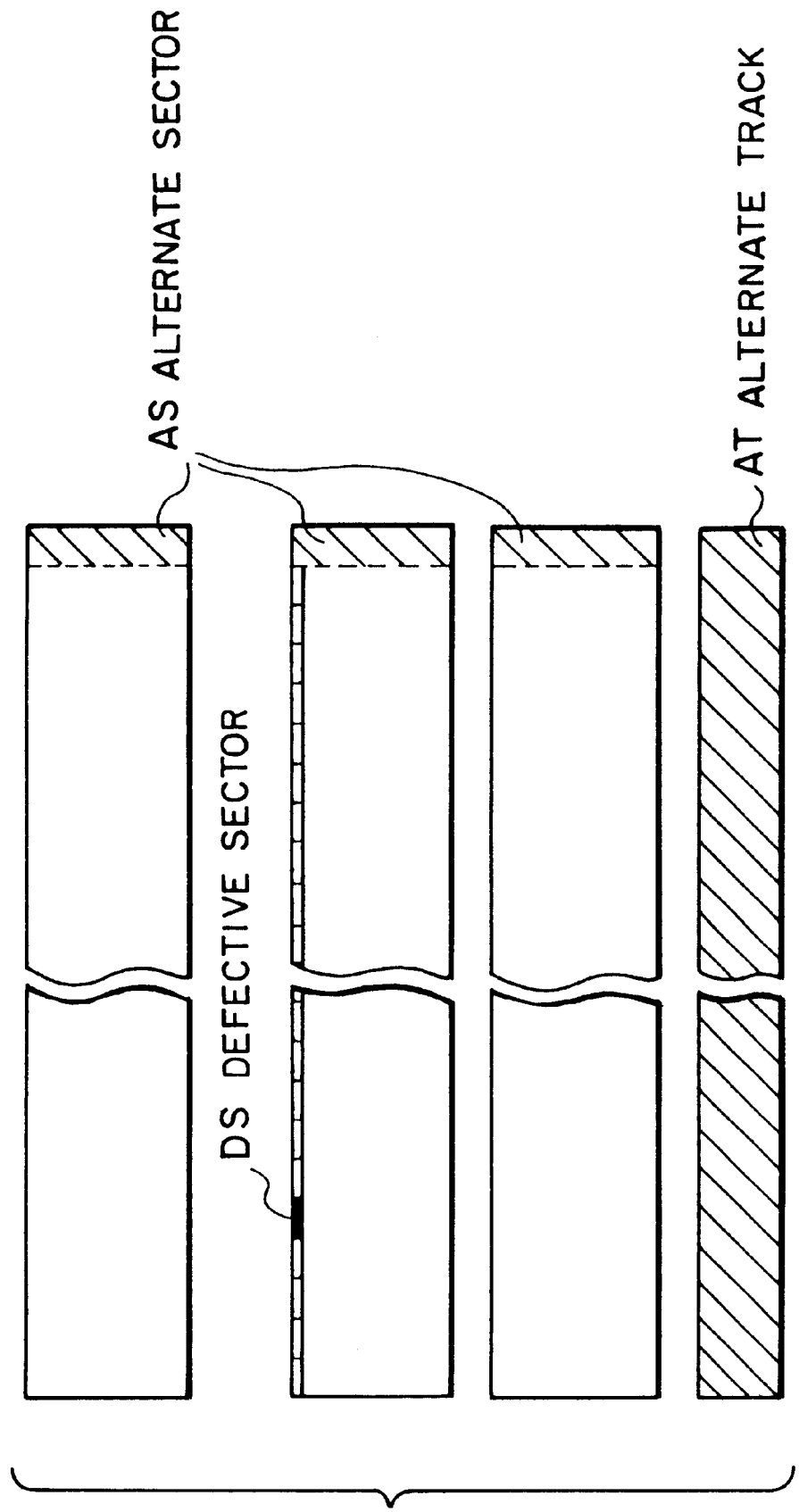
FIG. 8 shows developments of the disk-shaped recording medium illustrated in FIG. 7.

Referring to FIGS. 7 and 8, a conventional disk-shaped recording medium 41' will be described in order to facilitate an understanding of this invention. FIG. 7 shows a layout of alternate sectors and alternate tracks in the conventional disk-shaped recording medium 41' and FIG. 8 shows developments of FIG. 7.

The illustrated disk-shaped recording medium 41' comprises a plurality of tracks TR thereon which are arranged with concentric circles around a center O rotation thereof. Each track TR is divided in a circumferential direction into a predetermined number of sectors ST having a length equal to one another. In the example being illustrated, the alternate tracks depicted at AT are set as an alternate area in the disk-shaped recording medium 41' in the radial direction inward. In addition, the alternate sector depicted at AS are set in each track TR. When any defective sector DS is generated, an alternate processing is carried out by rearranging the sectors ST.

Inasmuch as the alternate sector AS is set every track TR regardless of the presence or absence of the defective sector DS, problem of degradation in recording efficiency for data arises in the disk-shaped recording medium 41', as mentioned in the preamble of the instant specification. In addition, inasmuch as the number of the alternate sectors AS set in every track TR is predetermined, it is inevitable that the alternate area is used as the alternate sectors when the defective sectors DS larger in number than the predetermined number occur in a certain track. In this event, it takes a long time to access the alternate sectors, as also mentioned in the preamble of the instant specification. In other words, it takes a long time to write/read data to/from the disk-shaped recording medium 41'.

Figure 9:
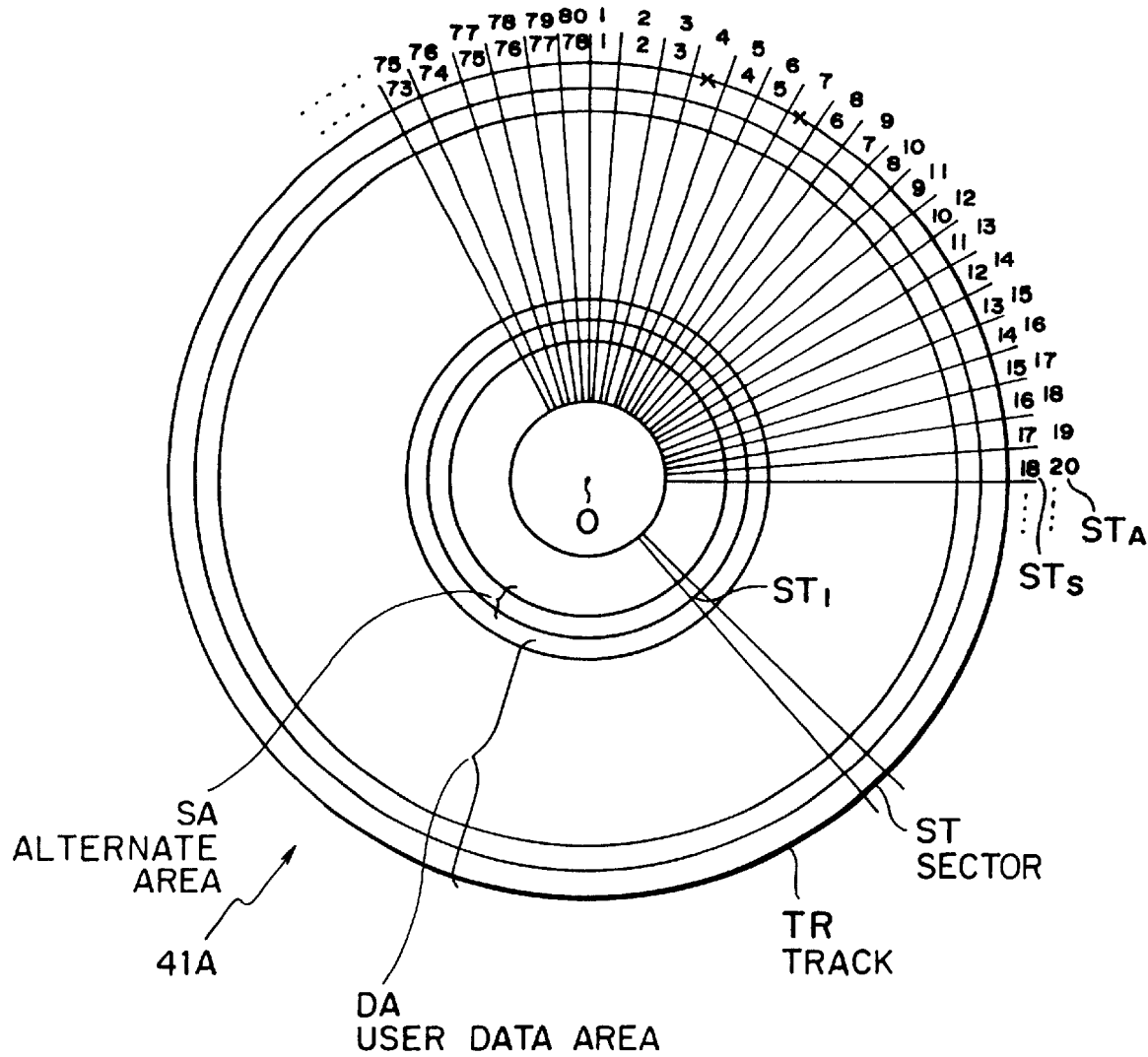
FIG. 9 is a plan view of a disk-shaped recording medium according to a second embodiment of this invention.

Referring to FIG. 9, the description will proceed to a disk-shaped recording medium 41A according to a second embodiment of this invention. The disk-shaped recording medium 41A comprises a plurality of tracks TR thereon which are arranged with concentric circles around a center O rotation thereof. Each track TR is divided in a circumferential direction into a predetermined number of sectors ST having a length equal equal to one another. It is assumed that the disk-shaped recording medium 41A has the storage capacity of 128 Mbytes. In this event, the disk-shaped recording medium 41A comprises the tracks TR which are equal in total number and in available total number to 1,866 and 1,564 each side, respectively. Each track TR is divided into the sectors ST which are equal in number to 80 as shown in FIG. 9. The disk-shaped recording medium 41A has a medium storage capacity of about 160 Mbytes in all both sides and has a format storage capacity of about 128 Mbytes in all both sides. That is, a physical formatting for the disk-shaped recording medium 41A arranges the tracks TR on the disk-shaped recording medium 41A with concentric circles that are equal in number to 1,564 on one side and divides each track TR into the sectors ST which are equal in number to 80. In addition, each sector ST consists of the servo field 80 and the data field 90 as illustrated in FIG. 6.

As described above, the formatting method for the disk-shaped recording medium 41A further comprises the step of separating the tracks TR into a user data area DA available to a user and an alternate area SA other than the user data area as the third physical stage S13 illustrated in FIG. 4. The alternate area SA is disposed in the disk-shaped recording medium 41A in a radial direction inward as shown in FIG. 9. The alternate area SA is provided with a predetermined sector $ST_1$ for storing the defective map.

Figures 10A, 10B:
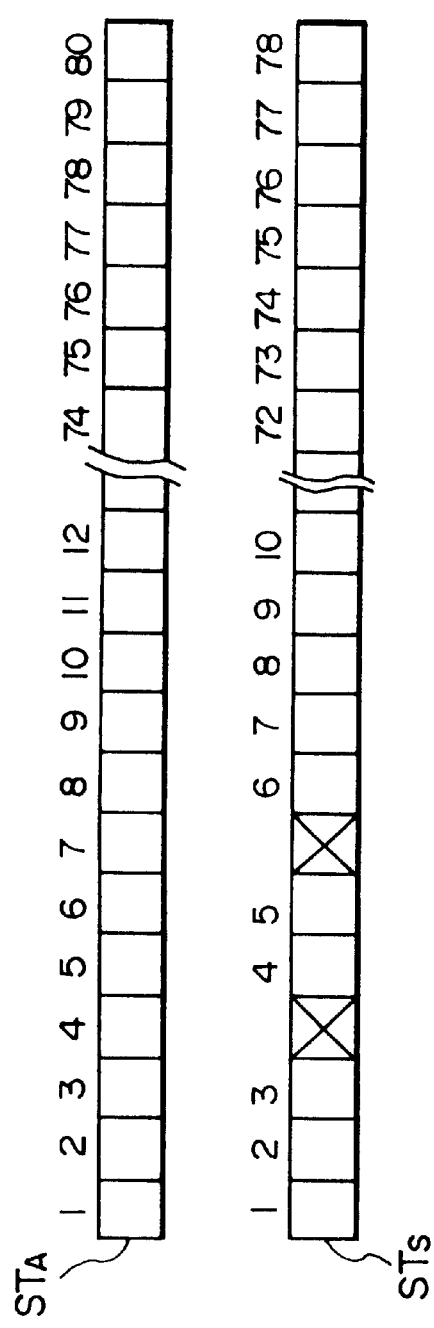
FIGS. 10A and 10B collectively show developments of a specific track in the disk-shaped recording medium illustrated in FIG. 9.

FIGS. 10A and 10B collectively show developments of a specific track in the disk-shaped recording medium 41A.

Figure 11:
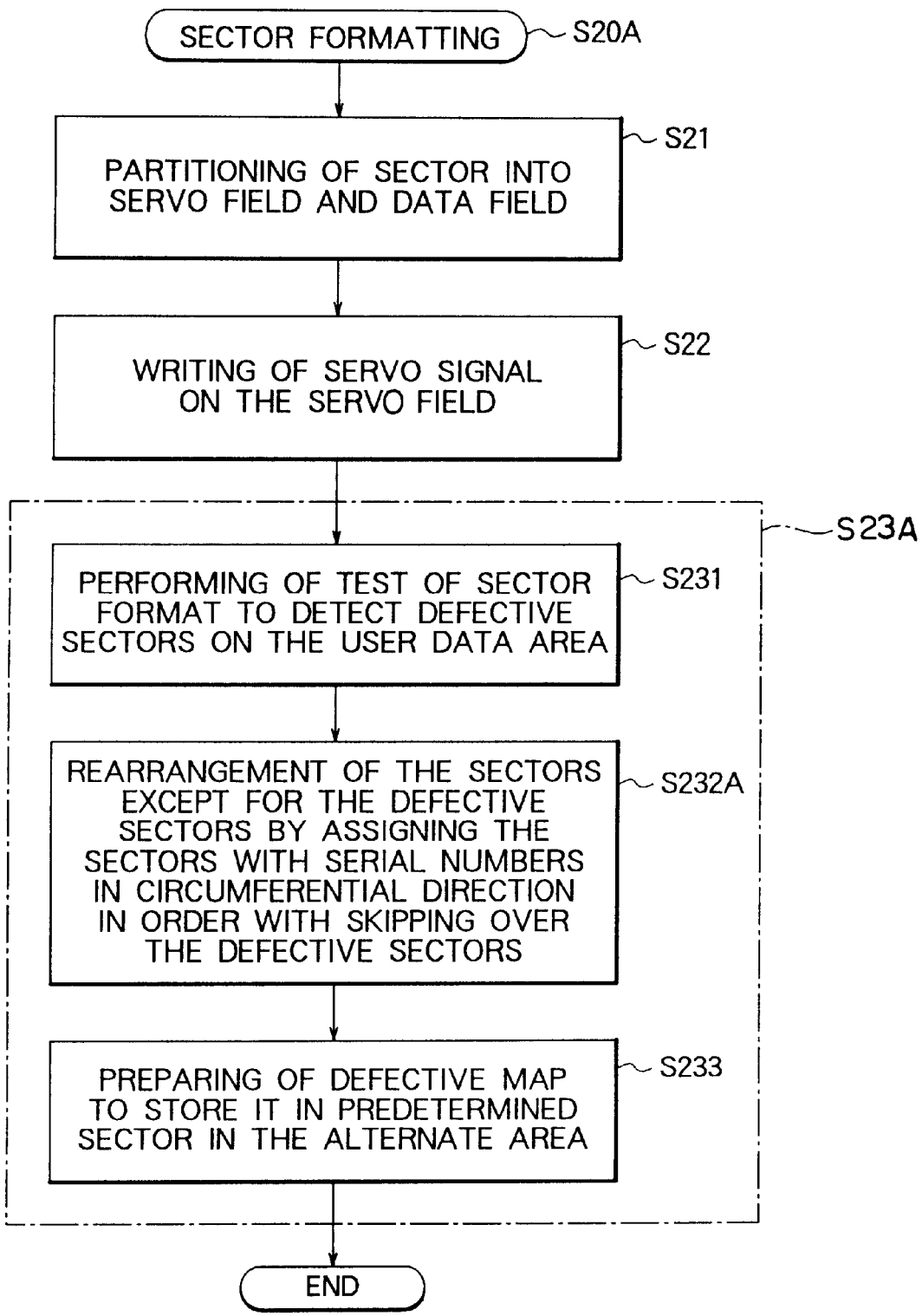
FIG. 11 is a flow chart for use in describing a sector formatting step for the disk-shaped recording medium illustrated in FIG. 9 according to a second embodiment of this invention.

Referring to FIG. 11 in addition to FIGS. 10A and 10B, description will proceed to a sector formatting step S20A according to a second embodiment of this invention. The illustrated sector formatting step S20A follows the physical formatting step S10 illustrated in FIG. 4. The illustrated sector formatting step S20A is similar in operation to that illustrated in FIG. 5 except that the test step is modified to different from that described in conjunction with FIG. 5 as will later become clear. The test step is therefore depicted at S23A.

As described above, the sector formatting step S20A is performed by using the servo writer (not shown) and the media formatter (not shown). The sector formatting step S20A comprises first through third sector formatting stages S21, S22, and S23A. At the first sector formatting stage S21, the servo writer partitions each sector ST into the servo field 80 (FIG. 6) and the data field 90 (FIG. 6). The first sector formatting stage S21 is followed by the second sector formatting stage S22 at which the servo writer the servo signal on the servo field 80 in the manner which is described above. In this event, the sectors ST in each track TR are assigned with the serial sector numbers of 1 to 80 in the circumferential direction in order without skipping as illustrated in FIGS. 9 and 10A. Such sectors having the serial sector numbers in the circumferential direction in serial order are herein referred to as apparent sectors STA. The second sector formatting stage S22 is succeeded by the third sector formatting stage or the test step S23A which is carried out by the media formatter.

More specifically, the test step S23A comprises first through third test stages S231, S232A, and S233. At the first test stage S231, the media formatter performs test of the sector format to detect defective sectors on the user data area DA. In the example being illustrated, it is assumed that the sectors having the sector numbers four and seven in the apparent sectors $ST_A$ are the defective sectors. The first test stage S231 is followed by the second test stage S232A at which the media formatter carries out rearrangement of the sectors ST except for the defective sectors by assigning the sectors ST with the serial sector numbers in the circumferential direction in order with skipping the defective sectors as illustrated in FIGS. 9 and 10B. Inasmuch as there is two defective sectors in the track TR in question in the example being illustrated, the serial sector numbers of 1 to 78 are assigned to the sectors ST with skipping the defective sectors. Such sectors having the serial sector numbers in the circumferential direction in order with skipping the defective sectors are herein referred to as substantially available sectors $ST_S$. The second test stage S232A is succeeded by the third test stage S233 at which the media formatter prepares a defective map which is a table for entering information indicating where the defective sectors on the user data area DA are arranged to which alternate sectors in the alternate area SA. The defective map is stored in the predetermined sector $ST_1$ in the alternate area SA. In addition, the alternate sectors equal in number to the defective sectors generated on the user data area DA are set in the alternate area SA.

If the storage capacity of the disk-shaped recording medium 41A sector-formatted is less than the predetermined specification storage capacity due to the presence of a lot of defective sectors, the sector-formatted disk-shaped recording medium 41A is discarded because the sector-formatted disk-shaped recording medium 41A cannot be used.

Although the serial sector numbers are assigned to the sectors in each track in the circumferential direction in order with skipping the defective sectors in the above-second embodiment, the defective map only may be stored in the predetermined sector $ST_1$ in the alternate area SA without the above-mentioned processing. This is because the removable type recording/reproducing device can detect locations of the defective sectors on the basis of the detective map stored in the predetermined sector $ST_1$ before reading/writing of data from/to the disk-shaped recording medium.

Accordingly, the removable type recording/reproducing device can sequentially perform reading/writing of data to/from the disk-shaped recording medium with skipping over any defective sector on reading/writing data from/to the sectors on a certain specific track TR in the circumferential direction in order. As a result, it is possible to access data a short time. In addition, it is possible to improve recording efficiency for data.

Figure 12:
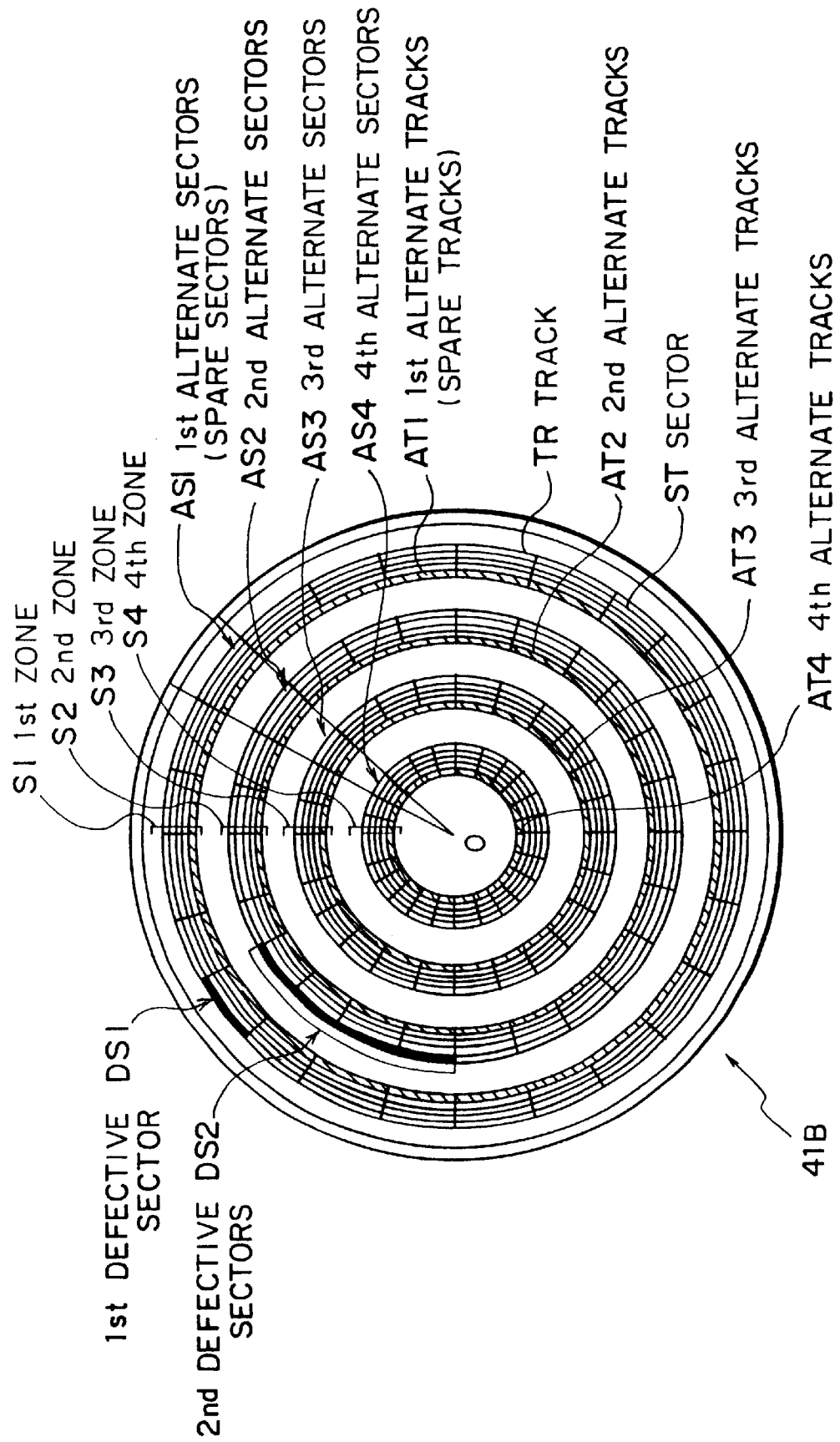
FIG. 12 is a plan view of a disk-shaped recording medium according to a third embodiment of this invention.
Figure 13:
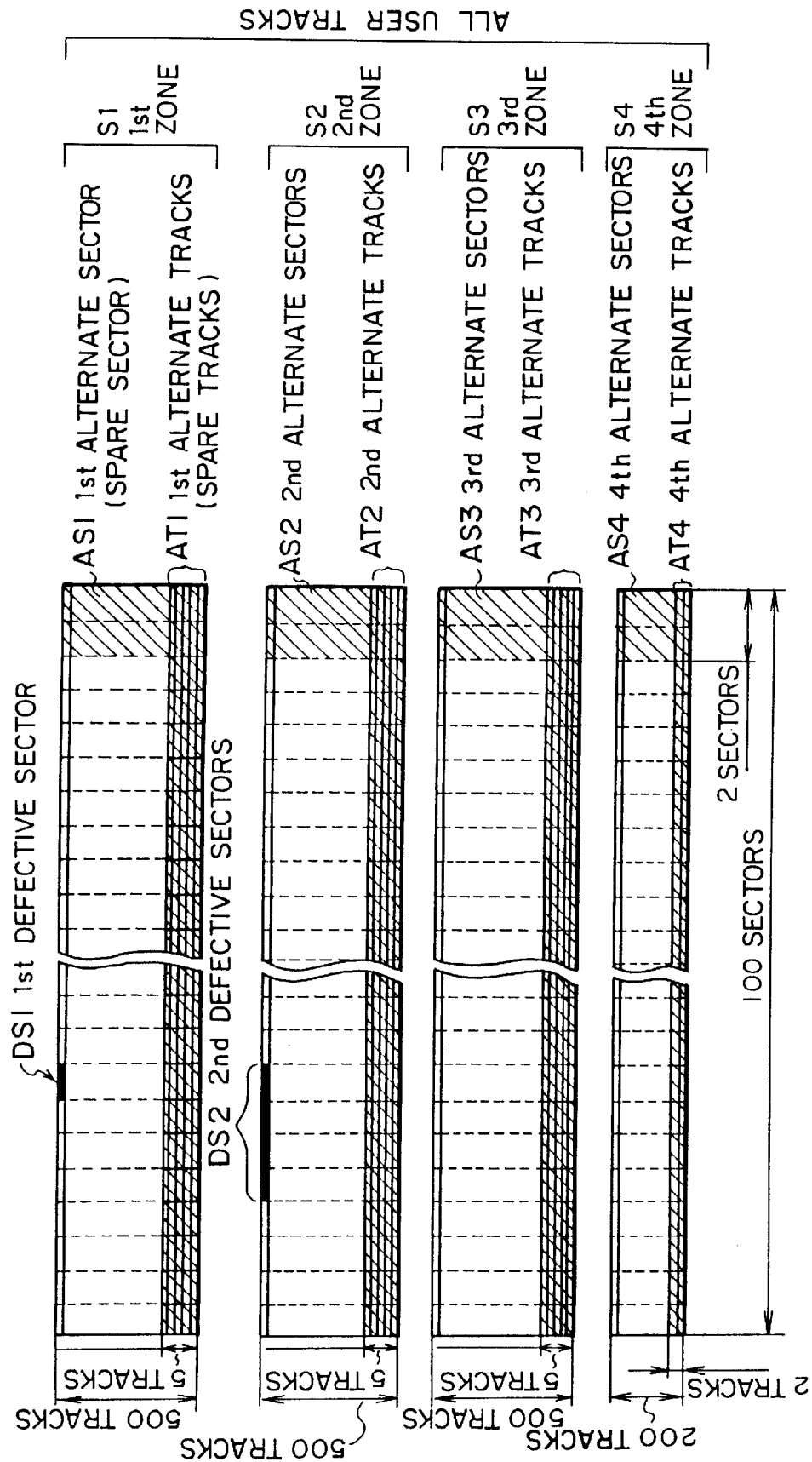
FIG. 13 shows developments of the disk-shaped recording medium illustrated in FIG. 12.

Referring to FIGS. 12 and 13, the description will proceed to a disk-shaped recording medium 41B according to a third embodiment of this invention. FIG. 12 shows a layout of alternate sectors and alternate tracks in the disk-shaped recording medium 41B and FIG. 13 shows developments of FIG. 12.

The illustrated disk-shaped recording medium 41B comprises a plurality of tracks TR thereon which are arranged with concentric circles around a center O rotation thereof. Each track TR is divided in a circumferential direction into a predetermined number of sectors ST having a length equal to one another. It is assumed that the disk-shaped recording medium 41B has the storage capacity of 128 Mbytes. In this event, the disk-shaped recording medium 41B comprises the tracks TR which are equal in total number and in available total number to 1,866 and 1,564 each side, respectively. Each track TR is divided into the sectors ST which are equal in number to 100 as shown in FIG. 13. The disk-shaped recording medium 41B has a medium storage capacity of about 160 Mbytes in all both sides and has a format storage capacity of about 128 Mbytes in all both sides. That is, a physical formatting for the disk-shaped recording medium 41B arranges the tracks TR on the disk-shaped recording medium 41B with concentric circles that are equal in number to 1,564 on one side and divides each track TR into the sectors ST which are equal in number to 100. In addition, each sector ST consists of the servo field 80 and the data field 90 as illustrated in FIG. 6.

In the third embodiment of this invention, the physical formatting for the disk-shaped recording medium 41B further separates the plurality of tracks (all user tracks) in radial direction into first through fourth zones S1, S2, S3, and S4 from outward to inward. Each of the first through the fourth zones S1 to S4 consists of a plurality of tracks. The first through the fourth zones S1 to S4 are provided not only with first through fourth alternate or spare tracks AT1, AT2, AT3, and AT4, respectively, but also with first through fourth alternate or spare sectors AS1, AS2, AS3, and AS4, respectively.

In the example being illustrated, as shown in FIG. 13, each of the first through the third zones S1 to S3 comprises 500 tracks. The first through the third alternate tracks AT1 to AT3 are disposed in the first through the third zones S1 to S3 in the radial direction inward and each of the first through the third alternate tracks AT1 to AT3 are equal in number to five. Each of the first through the third alternate sectors AS1 to SA3 are equal in number two for each track. The fourth zones S4 comprises 200 tracks. The fourth alternate tracks AT4 are disposed in the fourth zone S4 in the radial direction inward and are equal in number to two. The fourth alternate sectors AS4 are equal in number two for each track.

In addition, the disk-shaped recording medium 41B is provided with the predetermined sector (not shown) for storing the defective map.

Figure 14:
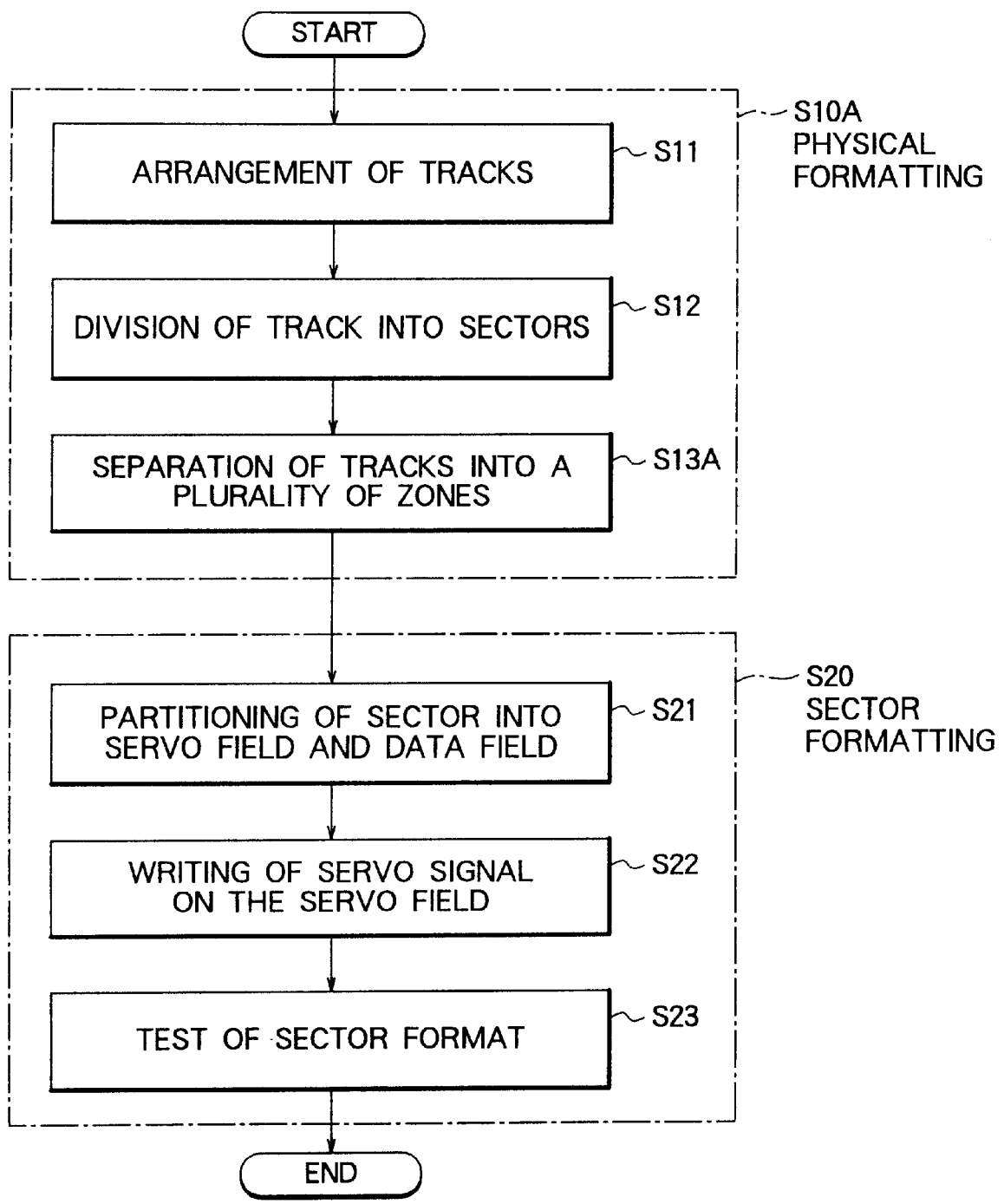
FIG. 14 is a flow chart for use in describing a formatting method for the disk-shaped recording medium illustrated in FIG. 12 according a third embodiment of this invention.

Turning to FIG. 14 in addition to FIGS. 12 and 13, description will proceed to a formatting method according to a third embodiment of this invention. The illustrated formatting method is similar in operation to that illustrated in FIG. 4 except that the physical formatting step is modified to different from that described in conjunction with FIG. 4 as will later become clear. The physical formatting step is therefore depicted at S10A.

The physical formatting step S10A is carried out with respect to a raw FD (not shown) by the high-density type FDD. More specifically, the physical formatting step S10A is similar in operation to that illustrated in FIG. 4 except that the third physical formatting stage is modified to different from that described in conjunction with FIG. 4 as will later become clear. The third physical formatting stage is therefore depicted at S13A. The first physical formatting stage S11 arranges the tracks TR on the disk-shaped recording medium 41B of the raw FD with concentric circles that are equal in number to 1,564 on one side. The first physical formatting stage S11 is followed by the second physical formatting stage S12. The second physical formatting stage S12 divides each track TR into the sectors ST which are equal in number to 100. The second physical formatting stage S12 is succeeded by the third physical formatting stage S13A. The third physical formatting stage S13A separates the tracks TR into the first through the fourth zones S1 to S4 as illustrated in FIGS. 12 and 13.

The physical formatting step S10A proceeds to the sector formatting step S20. The sector formatting step S20 is performed by using a servo writer (not shown) and a media formatter (not shown). The sector formatting step S20 comprises the first through the third sector formatting stages S21, S22, and S23. At the first sector formatting stage S21, the servo writer partitions each sector ST into the servo field 80 (FIG. 6) and the data field 90 (FIG. 6). The first sector formatting stage S21 is followed by the second sector formatting stage S22 at which the servo writer writes the servo signal on the servo field 80. In this event, the sectors ST of each track TR are assigned with the serial sector numbers of 1 to 100 in the circumferential direction in order. The second sector formatting stage S22 is succeeded by the third sector formatting stage S23 which is called the test step and which is carried out by the media formatter.

More specifically, the media formatter first performs test of the sector format to detect defective sectors on the all user tracks. In the example being illustrated, it is assumed that a first defective sector DS1 occurs in a track TR of the first zone S1 and second defective sectors DS2 occur in a track TR of the second zone S2. The second defective sectors DS consist of four successive sectors. In this event, the media formatter carries out rearrangement of the sectors ST except for the defective sectors. Particularly, the media formatter uses, as the alternate sector for the first defective sector DS1, one of the first alternate sectors AS1 on the same track of the first zone S1 that the first defective sector DS1 belongs to. On the other hand, the media formatter uses, as the alternate sectors for the second defective sectors DS2, the second alternate track AT2 of the second zone S2 that the second defective sectors DS2 belong to. Thereafter, the media formatter prepares the detective map which is a table for entering information indicating where the defective sectors on the all user tracks are arranged to which alternate sectors or tracks. The defective map is stored in the predetermined sector.

If the storage capacity of the disk-shaped recording medium 41B formatted is less than the predetermined specification storage capacity due to the presence of a lot of defective sectors, the formatted disk-shaped recording medium 41B is discarded because the formatted disk-shaped recording medium 41B cannot be used.

With this structure, it is possible to shorten an access time for writing/reading of data to/from the formatted disk-shaped recording medium 41B. This is because, when one or two defective sectors occur in the same track, one or two alternate sectors of the same track are used as the alternate sectors for the defective sectors. In addition, it is possible to shorten the access time for writing/reading of data to/from the formatted disk-shaped recording medium 41B in comparison with a conventional case where the alternate tracks are set in the radial direction inward or outward although a lot of defective sectors occur in the same track of a zone. This is because the alternate track of the zone in question is used as the alternate sectors for the defective sectors. As any rate, it is possible to access at a short time.

Figure 15:
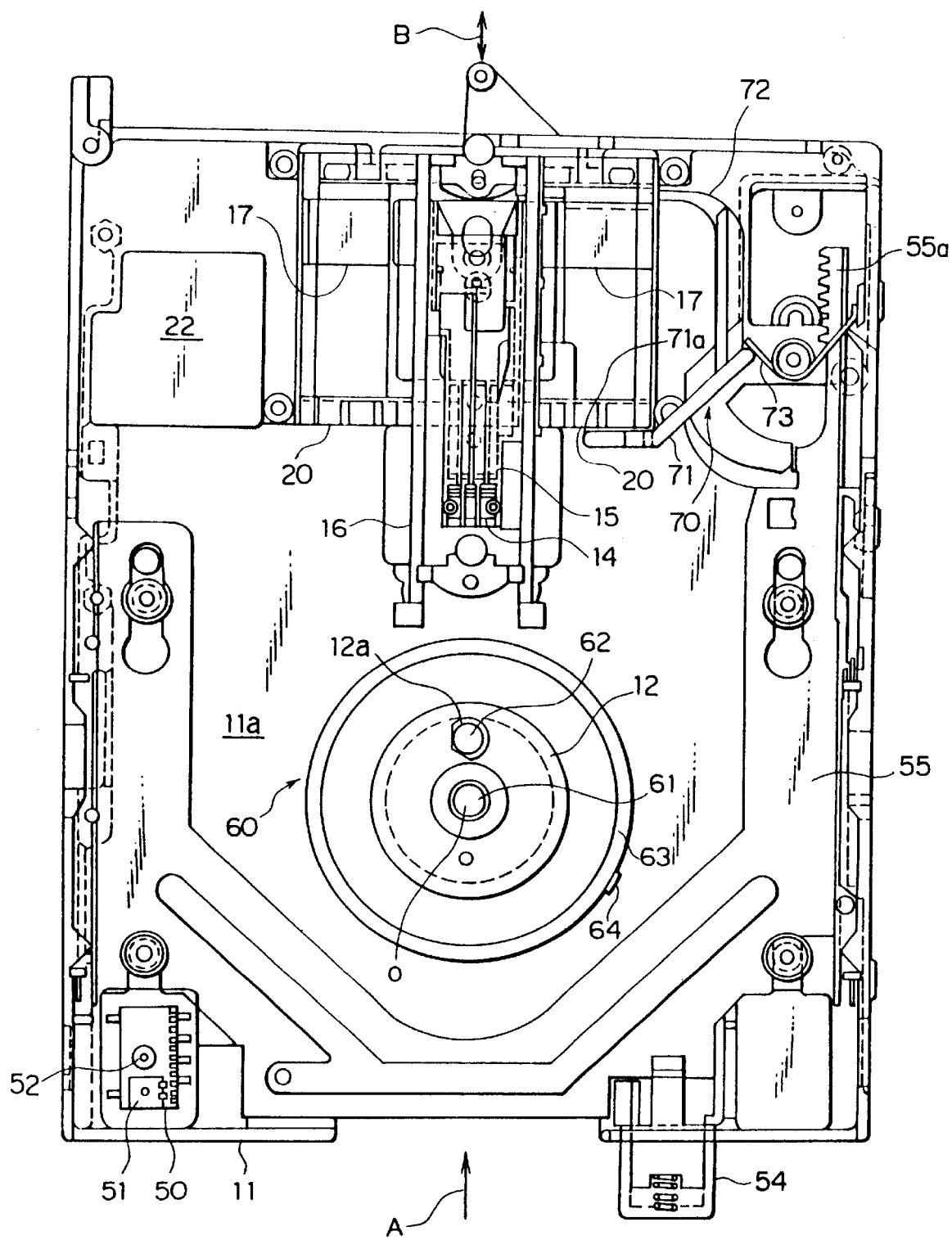
FIG. 15 is a plan view of another high-density type flexible disk drive (FDD) to which this invention is applicable.

Referring to FIG. 15, description will proceed to another high-density type FDD to which this invention is applicable. The illustrated high-density type FDD is similar in structure to that illustrated in FIG. 1 except that the type detecting switch 53 is omitted.

Figure 16A:
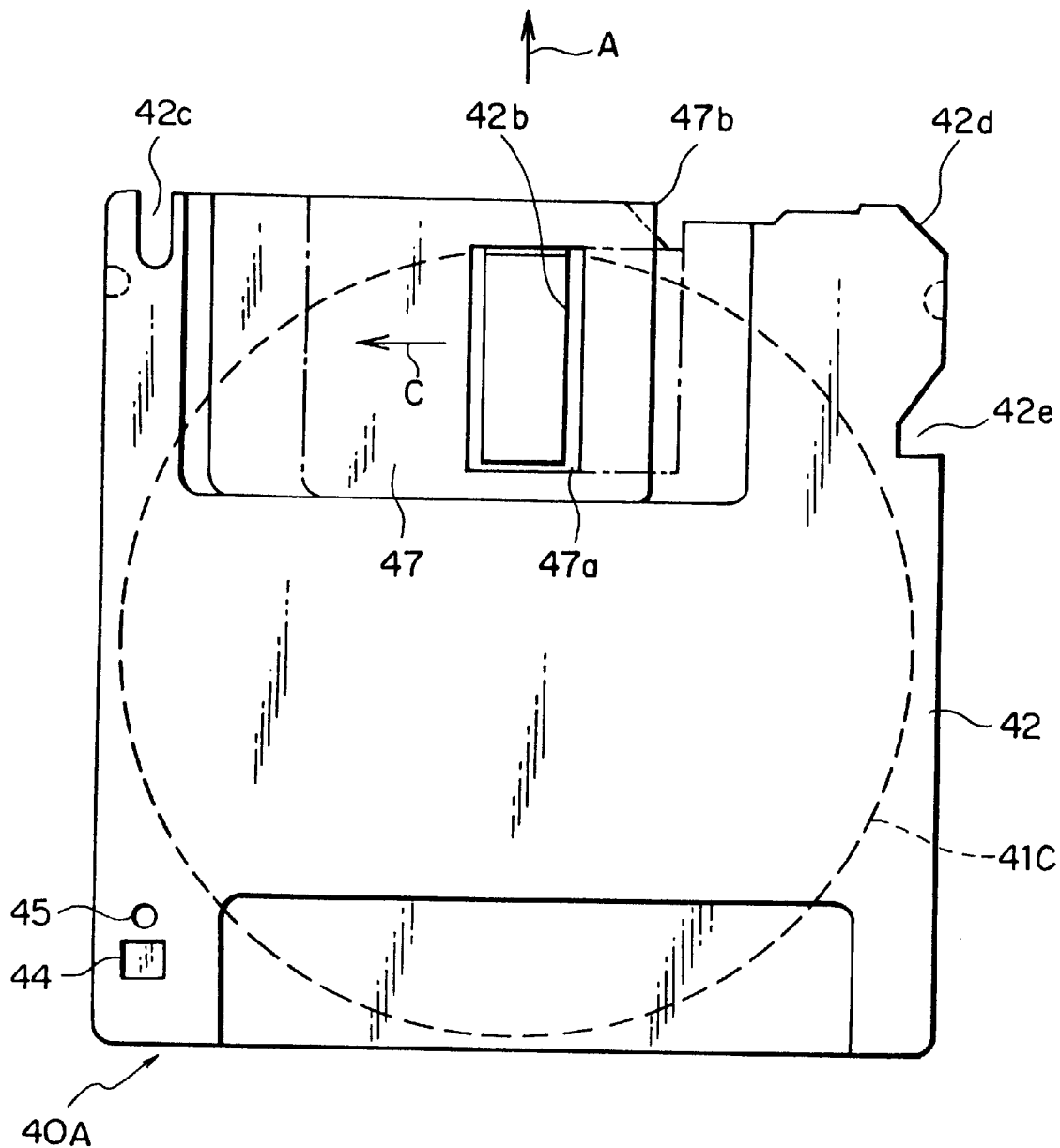
FIGS. 16A and 16B collectively show another large-capacity flexible disk (FD) loaded in the high-density type FDD illustrated in FIG. 15.
Figure 16B:
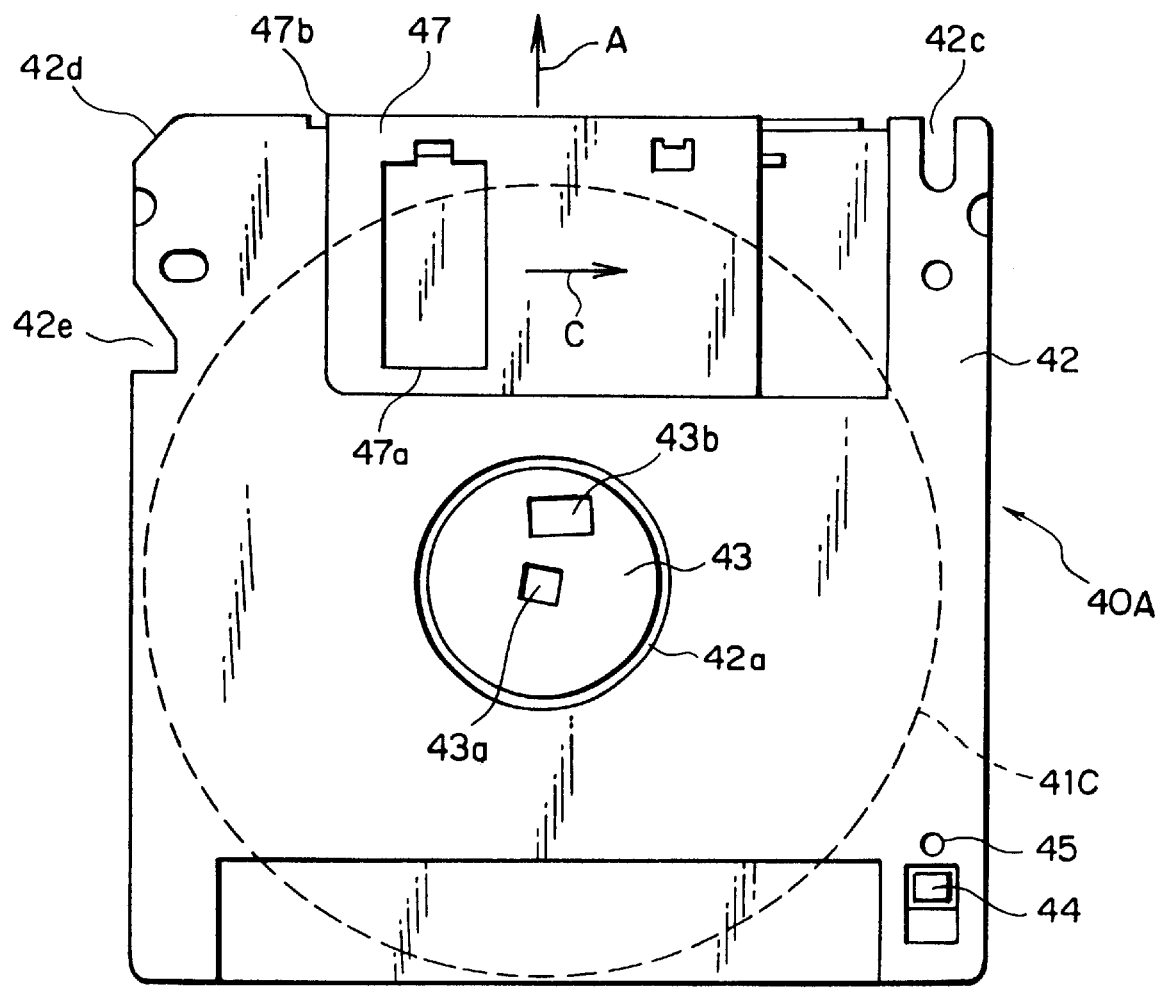
Figure 17:
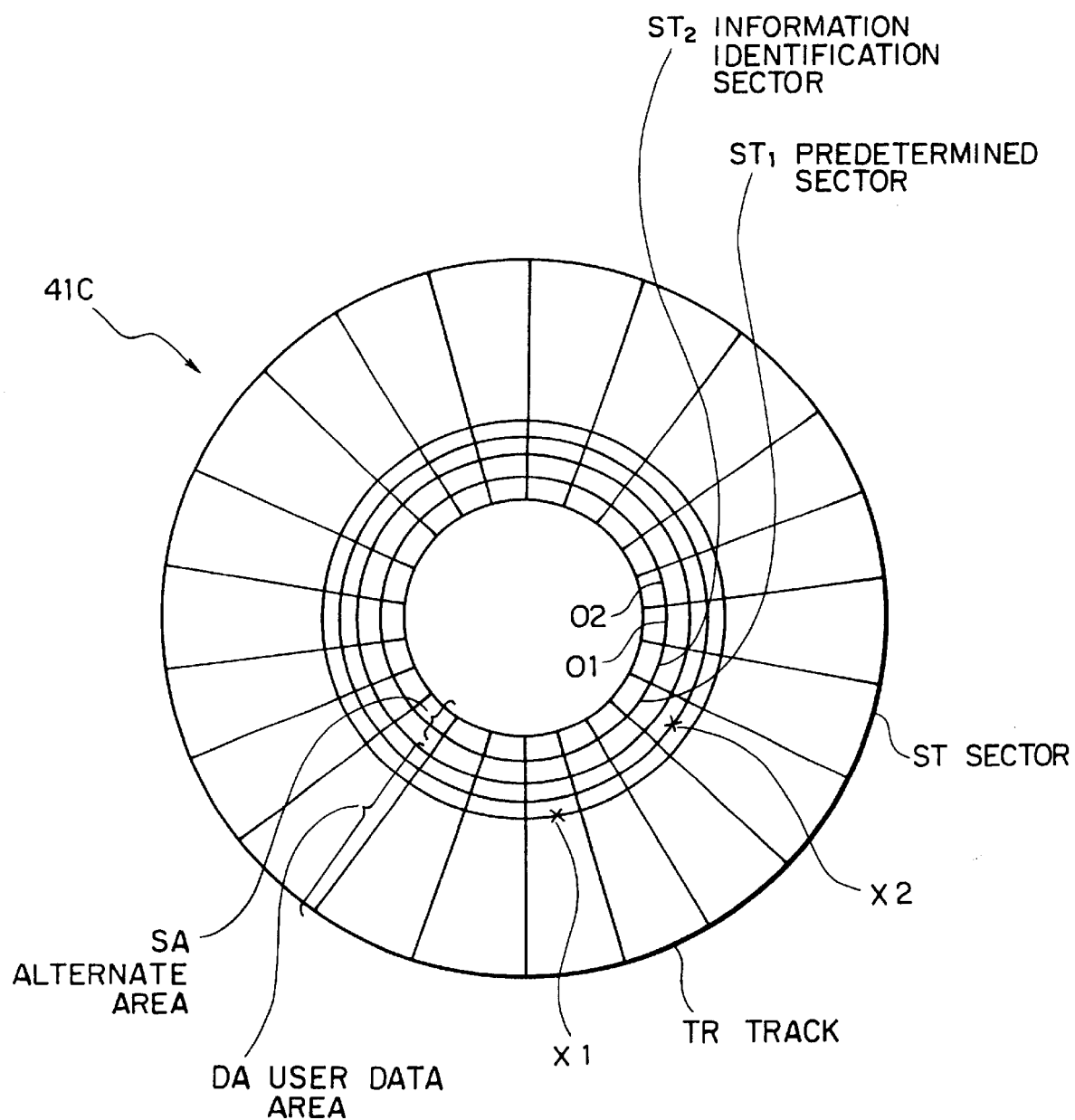
FIG. 17 is a plan view of a magnetic disk medium (a disk-shaped recording medium) according to a fourth embodiment of this invention for use in the large-capacity FD illustrated in FIGS. 16A and 16B.

Turning to FIGS. 16A, 16B, and 17, description will proceed to another large-capacity FD 40A which is loaded in the high-density type FDD illustrated FIG. 15. The illustrated large-capacity FD 40A is similar in structure to that illustrated in FIGS. 2A and 2B except that the type identifier hole 46 is omitted and the magnetic disk medium or the disk-shaped recording medium is modified to different from that described in conjunction with FIG. 3 as will later become clear. The disk-shaped recording medium is therefore depicted at 41C.

As shown in FIG. 17, the alternate area SA of the disk-shaped recording medium 41C is provided not only the predetermined sector $ST_1$ for storing the defective map but also with an information identification sector $ST_2$ for storing historic information in respect to preparation of the disk-shaped recording medium 41C. The historic information may be information indicative of storage capacity of the disk-shaped recording medium 41C, manufacturing data, a manufacturing place, a media manufacturer's name, a serial number, and so on.

It is presumed that the large-capacity FD 40A is loaded in the high-density type FDD illustrated in FIG. 15. In this event, the high-density type FDD can detect, in response to a detection signal from the switch unit 50, that the loaded FD is the large-capacity FD 40A. Thereafter, the high-density type FDD can detect the type of the loaded large-capacity FD 40A, namely, the storage capacity of the loaded large-capacity FD 40A by reading the historic information out of the information identification sector $ST_2$ by the magnetic head thereof.

It is assumed that the high-density type FDD illustrated in FIG. 15 is the double-density large-capacity FDD and the loaded large-capacity FD 40A is the single-density large-capacity FD. Under the circumstances, the double-density large-capacity FDD can control so as to carry out reproduction of the single-density large-capacity FD alone by detecting the storage capacity of loaded large-capacity FD 40A in the manner which is described above.

In addition, it is assumed that the loaded large-capacity FD 40A is defective or poor. In this event, the high-density type FDD can utilize the manufacturing data, the manufacturing place, the media manufacturer's name, and so on in the read historic information for poor cule information of the large-capacity FD 40A.

Although the predetermined sector ST and the information identification sector $ST_2$ are apart from each other in the above-mentioned embodiment, both of the defective map and the historic information may be stored in the same sector. In other words, the information identification sector $ST_2$ may share the predetermined sector $ST_1$. That is, the predetermined sector $ST_1$ may serve as the information identification sector $ST_2$ also.

Figure 18:
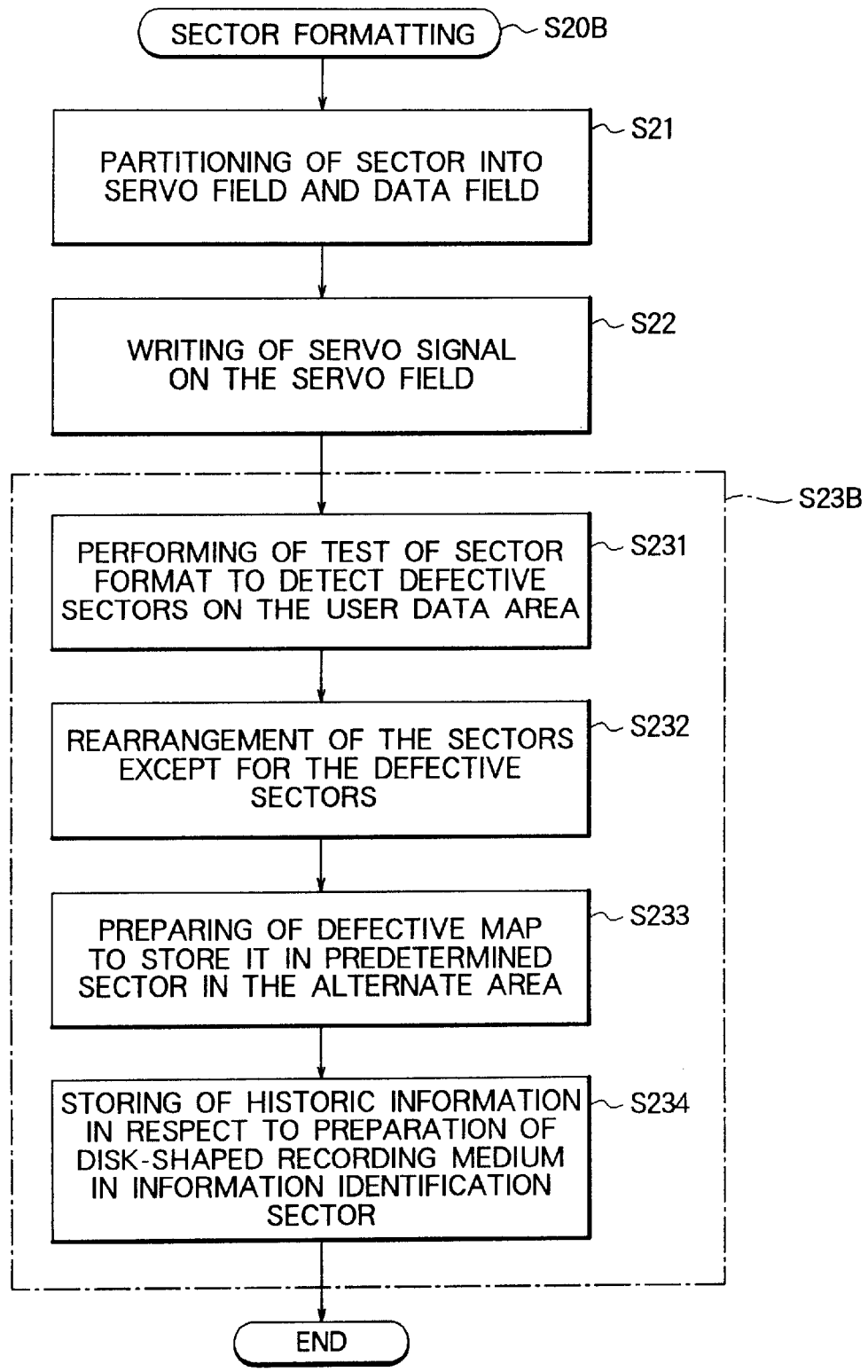
FIG. 18 is a flow chart for use in describing a sector formatting step for the disk-shaped recording medium illustrated in FIG. 17 according to a fourth embodiment of this invention.

Referring to FIG. 18 in addition to FIG. 17, description will proceed to a sector formatting step S20B according to a fourth embodiment of this invention. The illustrated sector formatting step S20B follows the physical formatting step S10 illustrated in FIG. 4. The illustrated sector formatting step S20B is similar in operation to that illustrated in FIG. 5 except that the test step is modified to different from that described in conjunction with FIG. 5 as will later become clear. The test step is therefore depicted at S23B.

As described above, the sector formatting step S20B is performed by using the servo writer (not shown) and the media formatter (not shown). The sector formatting step S20B comprises the first through the third sector formatting stages S21, S22, and S23B. At the first sector formatting stage S21, the servo writer partitions each sector ST into the servo field 80 (FIG. 6) and the data field 90 (FIG. 6). The first sector formatting stage S21 is followed by the second sector formatting stage S22 at which the servo writer the servo signal on the servo field 80 in the manner which is described above. The second sector formatting stage S22 is succeeded by the third sector formatting stage or the test step S23B which is carried out by the media formatter.

More specifically, the test step S23B is similar in operation to that illustrated in FIG. 5 except that the test step S23B further comprises a fourth test stage S234 as well as the first through the third test stages S231, S232, and S233. At the first test stage S231, the media formatter performs test of the sector format to detect defective sectors on the user data area DA. In the example being illustrated, it is assumed that there is the defective sectors depicted at x1, x2, . . . , and so on as shown in FIG. 17. The first test stage S231 is followed by the second test stage S232 at which the media formatter carries out rearrangement of the sectors ST except for the defective sectors. In the example being illustrated, the media formatter carries out rearrangement of the sectors ST so that the defective sectors x1 and x2 are alternated by alternate sectors depicted at 01 and 02 in the alternate area SA, respectively. The second test stage S232 is succeeded by the third test stage S233 at which the media formatter prepares the defective map which is a table for entering information indicating where the defective sectors on the user data area DA are arranged to which alternate sectors in the alternate area SA. The defective map is stored in the predetermined sector $ST_1$ in the alternate area SA. If the storage capacity of the disk-shaped recording medium 41C sector-formatted is less than the predetermined specification storage capacity due to the presence of a lot of defective sectors, the sector-formatted disk-shaped recording medium 41C is discarded because the sector-formatted disk-shaped recording medium 41C cannot be used. The first through the third test stages S231 to S233 are identical with those illustrated in FIG. 5.

In this embodiment, the third test stage S233 proceeds to the fourth test stage S234 at which the media formatter writes the historic information in respect to preparation of the disk-shaped recording medium 41C in the information identification sector $ST_2$ in the alternate area SA.

While this invention has thus far been described in conjunction with several preferred embodiments thereof, it will now be readily possible for those skilled in the art to put this invention into various other manners. For example, the number of the zones is not restricted to four in the third embodiment and the number of the zones may be two, three, five or more. In addition, the number of the alternate tracks set in each zone and the number of the alternate sectors set in each track are not restricted to those in the third embodiment but may be selected from any number. Furthermore, the alternate sectors for each track may be omitted although the alternate sectors are set in each track in the third embodiment.

What is claimed is:

1. A large-capacity flexible disk comprising:

a disk-shaped magnetic disk medium on which a plurality of tracks are arranged with concentric circles, each track being divided in a circumferential direction into a predetermined number of sectors having a length equal to one another, and each sector comprising a servo field and a data field;

wherein each servo field comprises a number field indicating a position of the sector in which it is provided, and a sector timing mark field preceding the number field and notifying the number field;

wherein the number field includes a space for storing alteration contents of said disk-shaped magnetic disk medium; and wherein the servo field further comprises, in front of the number field, a preamble field and, behind the number field, a zero field for a phase matching, a plurality of burst fields for detecting position deviation, and a pad field for another phase matching.

2. A large-capacity flexible disk as claimed in claim 1, wherein said number field comprises a sector number field in which the alteration contents and a sector number are written and a track number field in which a track number is written, and wherein said servo field further comprises codes, in front of and behind the sector number field, that indicate start and end of the sector number field, respectively.

3. A method of formatting a large-capacity flexible disk comprising a disk-shaped magnetic disk medium, said method comprising:

a physical formatting step of arranging a plurality of tracks on the disk-shaped magnetic disk medium with concentric circles and of dividing each track into a predetermined number of sectors; and a sector formatting step of partitioning each sector into a servo field and a data field, and of forming the servo field to include a number field indicating a position of the sector in which it is provided and a sector timing mark field preceding the number field;

wherein the number field is formed to include a space for storing alteration contents of said disk-shaped magnetic disk medium; and wherein said servo field is formed to include, in front of the number field, a preamble field and, behind the number field, a zero field for a phase matching, a plurality of burst fields for detecting position deviation, and a pad field for another phase matching.

4. A method as claimed in claim 3, wherein the number field is formed to include a sector number field in which the alteration contents and a sector number is written and a track number field in which a track number is written.

* * * * *